(12) United States Patent
Katata et al.

(10) Patent No.: US 8,149,655 B2
(45) Date of Patent: Apr. 3, 2012

(54) INFORMATION RECORDING MEDIUM, INFORMATION RECORDING APPARATUS AND METHOD, INFORMATION REPRODUCING APPARATUS AND METHOD, AND COMPUTER PROGRAM

(75) Inventors: Keiji Katata, Saitama (JP); Masayoshi Yoshida, Saitama (JP); Toshiro Tanikawa, Saitama (JP); Kazuo Kuroda, Saitama (JP)

(73) Assignee: Pioneer Corporation, Tokyo (JP)

( * ) Notice: Subject to any disclaimer, the term of this patent is extended or adjusted under 35 U.S.C. 154(b) by 585 days.

(21) Appl. No.: 10/577,225

(22) PCT Filed: Sep. 14, 2005

(86) PCT No.: PCT/JP2005/016910
§ 371 (c)(1),
(2), (4) Date: Jul. 10, 2006

(87) PCT Pub. No.: WO2006/030812
PCT Pub. Date: Mar. 23, 2006

(65) Prior Publication Data
US 2007/0081795 A1 Apr. 12, 2007

(30) Foreign Application Priority Data
Sep. 17, 2004 (JP) ................... 2004-271369

(51) Int. Cl.
*G11B 21/08* (2006.01)
(52) U.S. Cl. .................................... 369/30.03
(58) Field of Classification Search ............ 386/125
See application file for complete search history.

(56) References Cited

U.S. PATENT DOCUMENTS

| | | | |
|---|---|---|---|
| 3,499,886 A | 3/1970 | Mehltretter | 260/233.5 |
| 3,511,830 A | 5/1970 | Speakman | 260/233.5 |
| 3,513,156 A | 5/1970 | Speakman | 260/233.5 |
| 3,580,906 A | 5/1971 | Bernasek et al. | 260/233.5 |
| 3,620,913 A | 11/1971 | Wheaton | 162/175 |
| 5,648,954 A | 7/1997 | Satoh | |
| 5,780,568 A | 7/1998 | Vuorenpaa et al. | 527/300 |
| 6,108,291 A * | 8/2000 | Ono et al. | 369/47.11 |
| 6,263,152 B1 * | 7/2001 | Hisatomi et al. | 386/70 |
| 6,365,140 B1 | 4/2002 | Melby et al. | 424/70.1 |
| 7,031,239 B2 * | 4/2006 | Takahashi et al. | 369/47.14 |

(Continued)

FOREIGN PATENT DOCUMENTS
CN     1525443     9/2004
(Continued)

OTHER PUBLICATIONS

Tappi vol. 45, No. 9, Sep. 1962, pp. 750-752.

(Continued)

*Primary Examiner* — Joseph Feild
*Assistant Examiner* — Henok Heyi
(74) *Attorney, Agent, or Firm* — Young & Thompson

(57) ABSTRACT

An information recording medium (100), provided with: a first recording layer (L0 layer) and a second recording layer (L1 layer) in each of which record information can be alternately recorded, at least one of the first recording layer and the second recording layer provided with: an anchor area (AP#1 to 4) which is to record therein anchor information (VRS, AVDP, VAT_ICB) and which is referred to in reading file system information (101, 111) for controlling at least one of recording and reproduction of the record information; and an update area to update and record therein the anchor information.

8 Claims, 14 Drawing Sheets

U.S. PATENT DOCUMENTS

| | | | |
|---|---|---|---|
| 7,551,532 B2* | 6/2009 | Hwang et al. | 369/47.14 |
| 2002/0136134 A1 | 9/2002 | Ito et al. | |
| 2003/0059205 A1* | 3/2003 | Suzuki | 386/94 |
| 2003/0137909 A1* | 7/2003 | Ito et al. | 369/47.14 |
| 2003/0179669 A1* | 9/2003 | Takahashi et al. | 369/47.14 |
| 2003/0193859 A1* | 10/2003 | Mitsuda et al. | 369/47.13 |
| 2004/0037794 A1 | 2/2004 | Dubief | 424/70.13 |
| 2004/0042370 A1* | 3/2004 | Sugimura et al. | 369/59.25 |
| 2004/0114474 A1 | 6/2004 | Park et al. | |
| 2004/0174793 A1 | 9/2004 | Park et al. | |
| 2005/0237877 A1* | 10/2005 | Yamanaka | 369/44.26 |
| 2006/0171281 A1* | 8/2006 | Takahashi et al. | 369/53.17 |
| 2006/0171282 A1* | 8/2006 | Takahashi et al. | 369/53.17 |
| 2007/0081795 A1* | 4/2007 | Katata et al. | 386/125 |
| 2007/0201343 A1* | 8/2007 | Kuroda et al. | 369/275.3 |

FOREIGN PATENT DOCUMENTS

| | | |
|---|---|---|
| EP | 1298666 | 4/2003 |
| EP | 1729298 | 12/2006 |
| FR | 2 805 270 | 5/2000 |
| GB | 675793 | 7/1952 |
| GB | 1 190 000 | 4/1970 |
| JP | 2001-23170 | 1/2001 |
| JP | 2001-351336 | 12/2001 |
| JP | 2002-352469 | 12/2002 |
| JP | 2003-173285 | 6/2003 |
| JP | 2004-87011 | 3/2004 |
| NL | 6 717 509 | 7/1968 |
| WO | 95/25750 | 9/1995 |
| WO | 02/07684 | 1/2002 |
| WO | 02/074265 | 9/2002 |
| WO | 03/038823 | 5/2003 |
| WO | 2004/079739 | 9/2004 |

OTHER PUBLICATIONS

English Language abstract page of WO 01/62805 which is equivalent to FR 2 805 270.

English Language abstract page of WO 02/074265, printed from the esp@cenet web site on Feb. 8, 2006.

Extended European Search Report issued on Nov. 18, 2011 by the European Patent Office in counterpart European Application No. 05783199.2, 10 pages.

* cited by examiner

[FIG. 1]
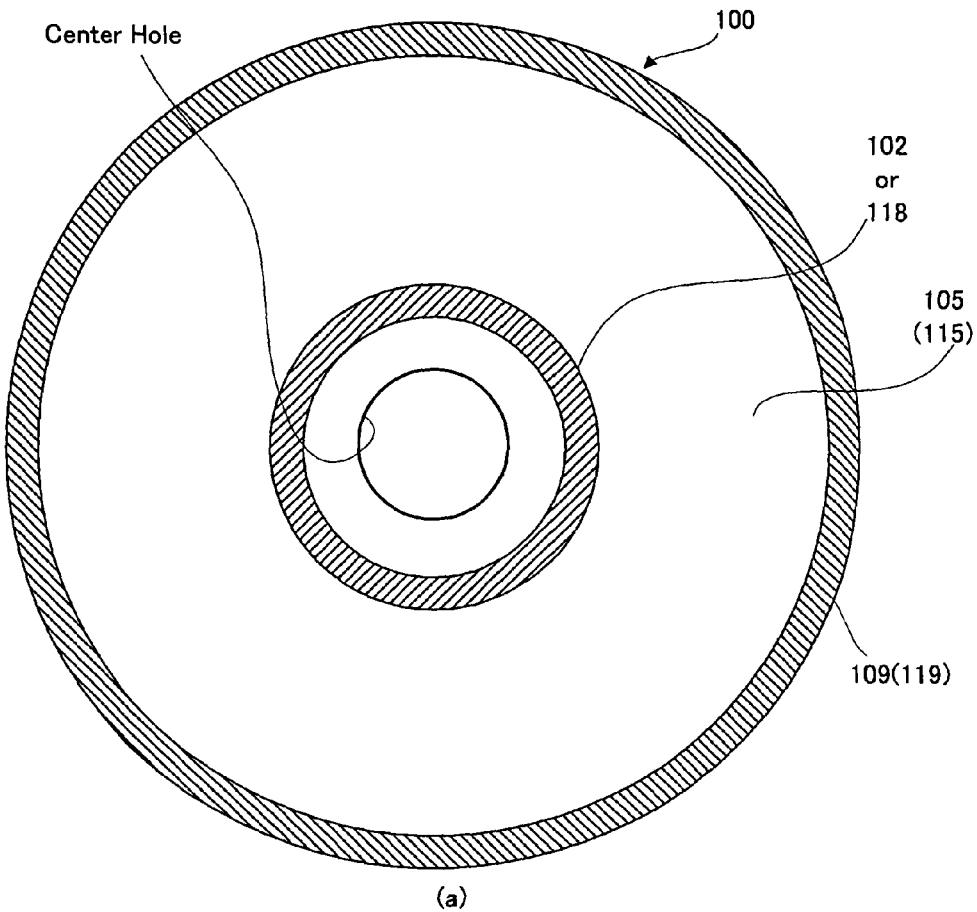
(a)
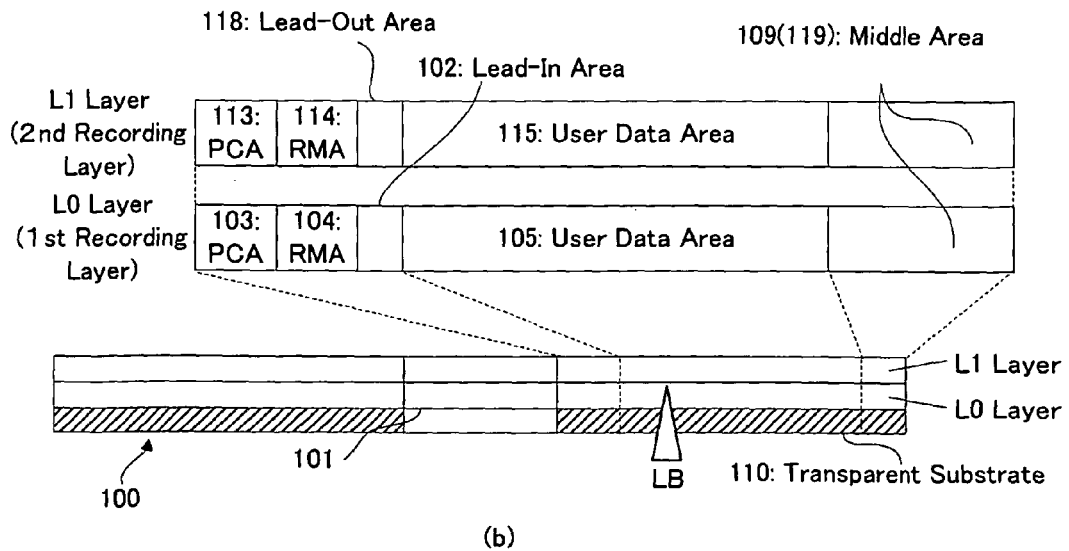
(b)

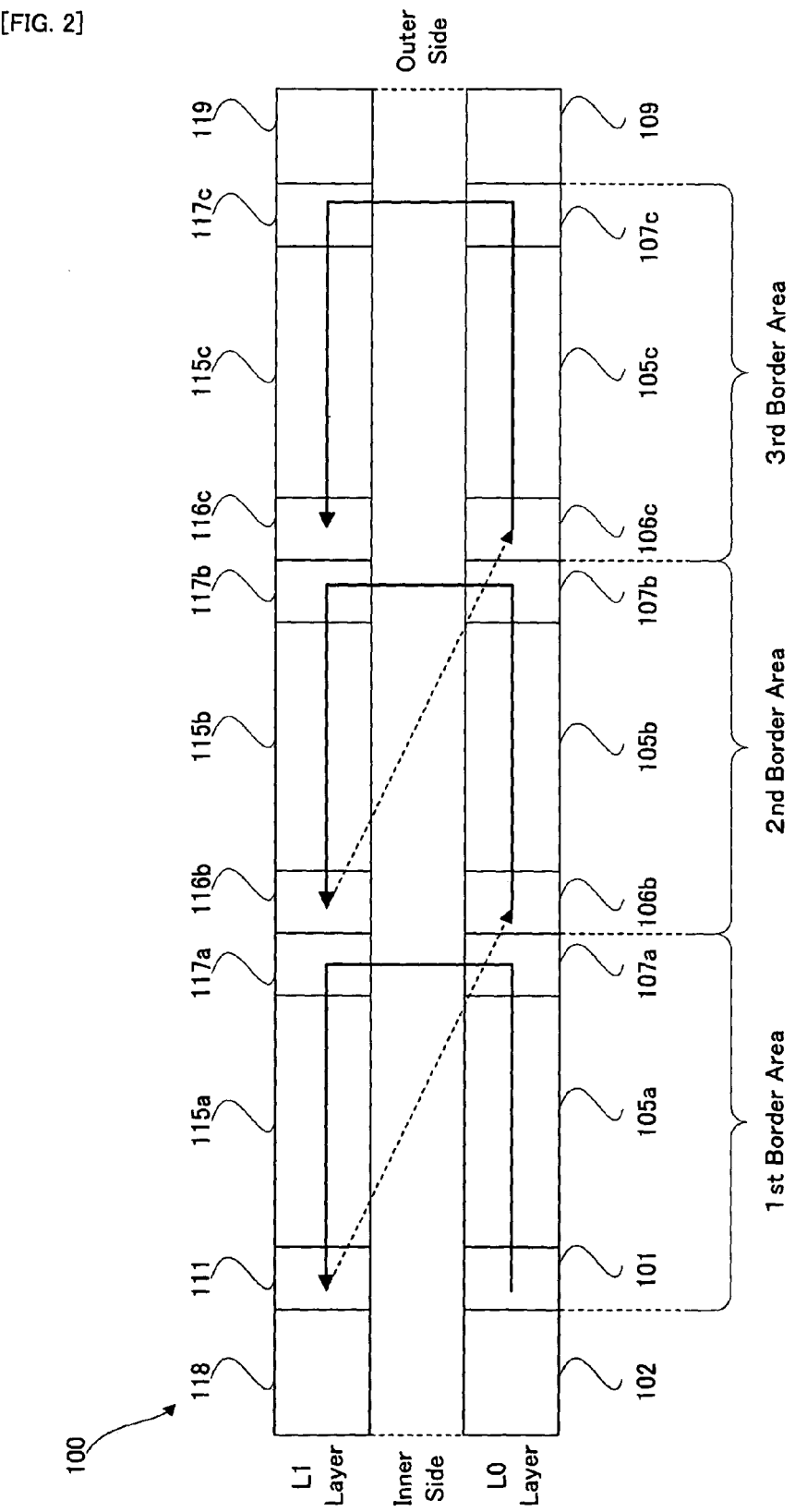

[FIG. 3]

| Byte Position | Content |
|---|---|
| 0 to 3 | Update Block Sector Pointer (AP#1) |
| 4 to 7 | Update Block Sector Pointer (AP#2) |
| 8 to 11 | Update Block Sector Pointer (AP#3) |
| 12 to 15 | Update Block Sector Pointer (AP#4) |
| 16 to 31 | Reserved |
| 32 to 35 | Start Sector No. (Border Out: L0) |
| 36 to 39 | Start Sector No. (Border Out: L1) |
| 40 to end | Other |

Rows 0 to 15 braced as 121.

[FIG. 4]

| Anchor Point | Logical Block Address | Content |
|---|---|---|
| AP#1 | 16h | VRS |
| AP#2 | 256h | AVDP |
| AP#3 | LRA−256h | AVDP |
| AP#4 | LRA | VAT_ICB |

[FIG. 5]
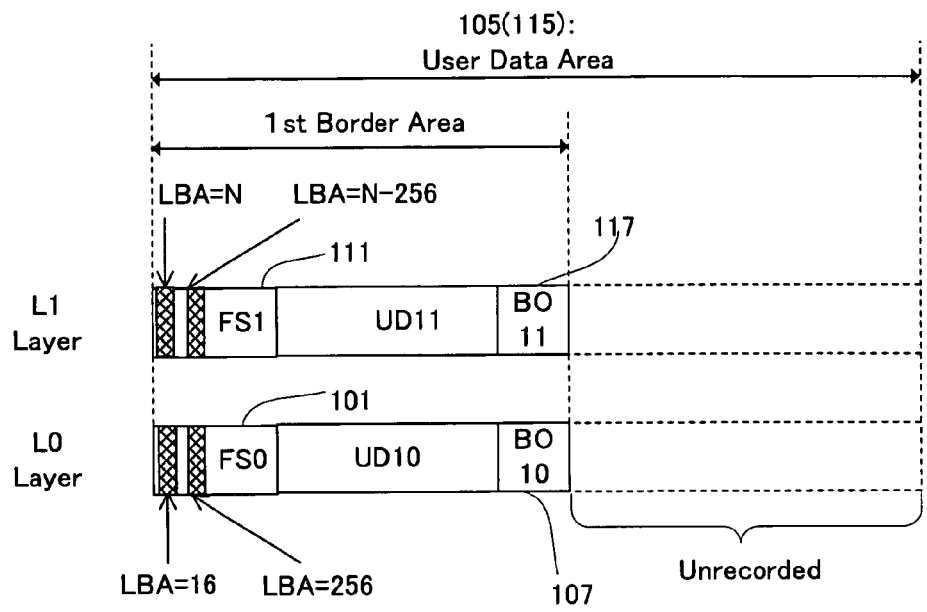
(a)
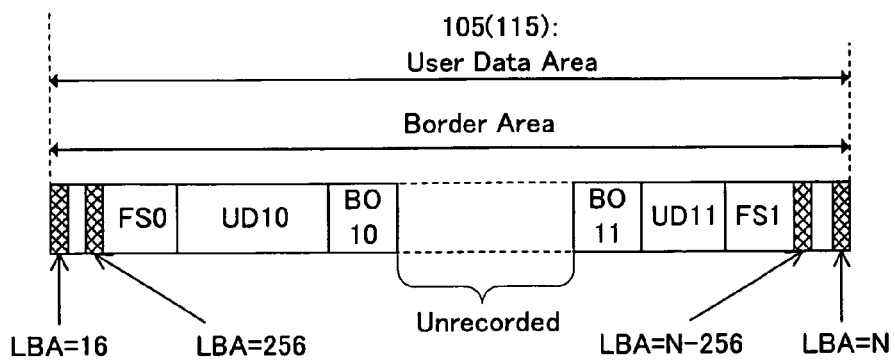
(b)

[FIG. 6]

| Bit Position | Content | |
|---|---|---|
| 0 | Update Block Sector Effective Flag (AP#1) | ⎫ |
| 1 | Update Block Sector Effective Flag (AP#2) | ⎬ 131 |
| 2 | Update Block Sector Effective Flag (AP#3) | |
| 3 | Update Block Sector Effective Flag (AP#4) | ⎭ |
| 4 to 7 | Reserved | |

[FIG. 7]
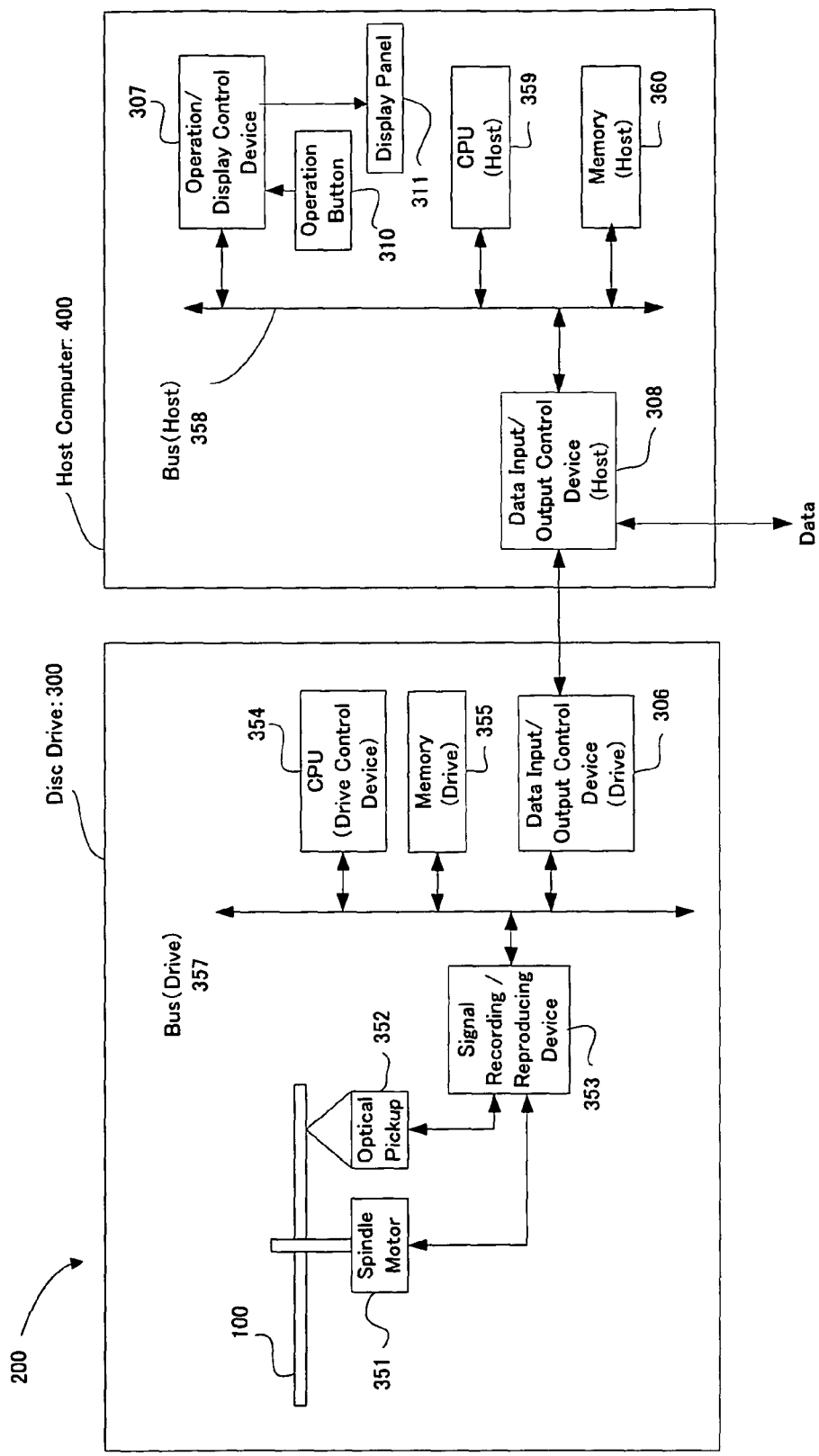

[FIG. 8]
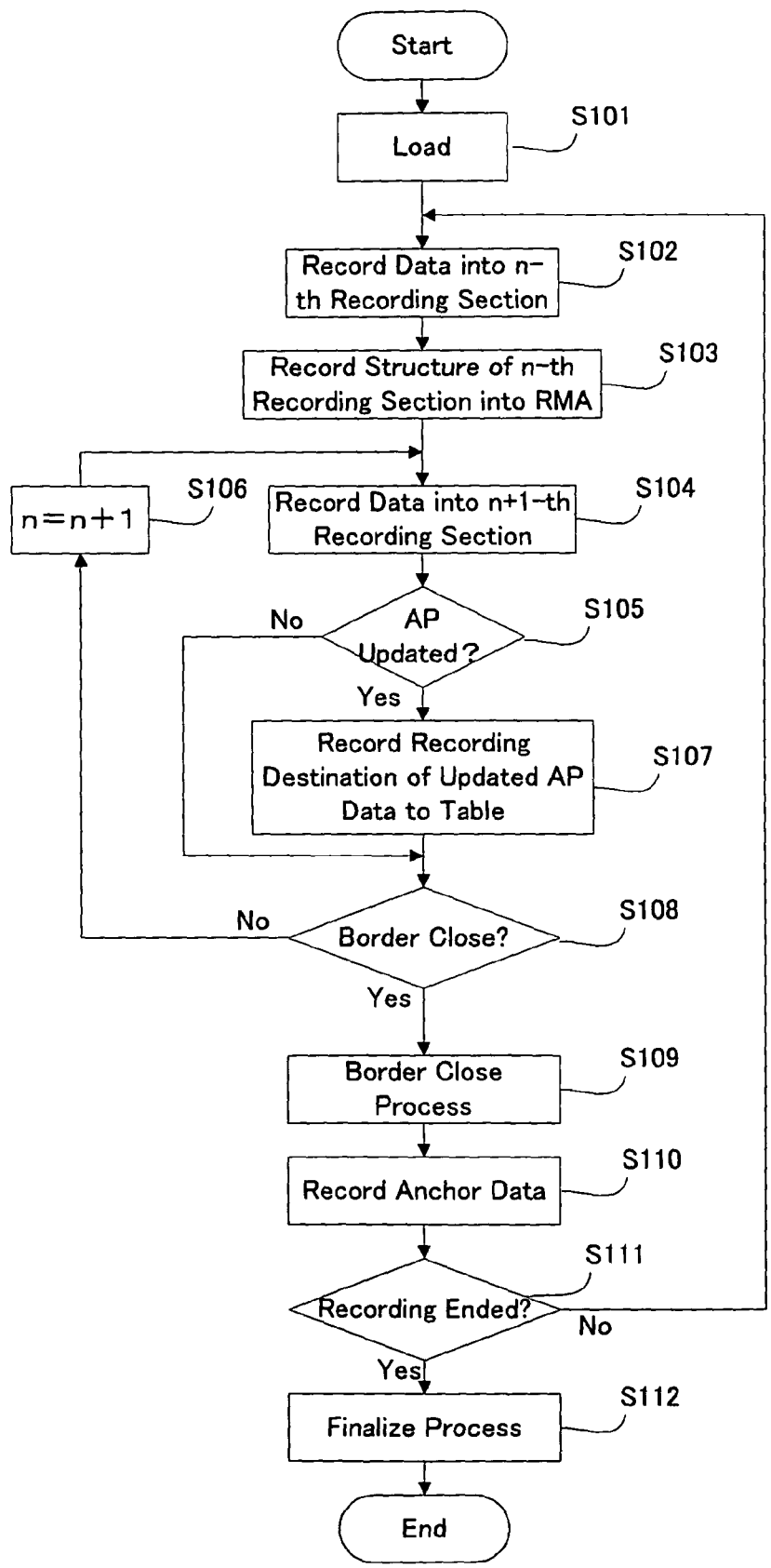

[FIG. 9]
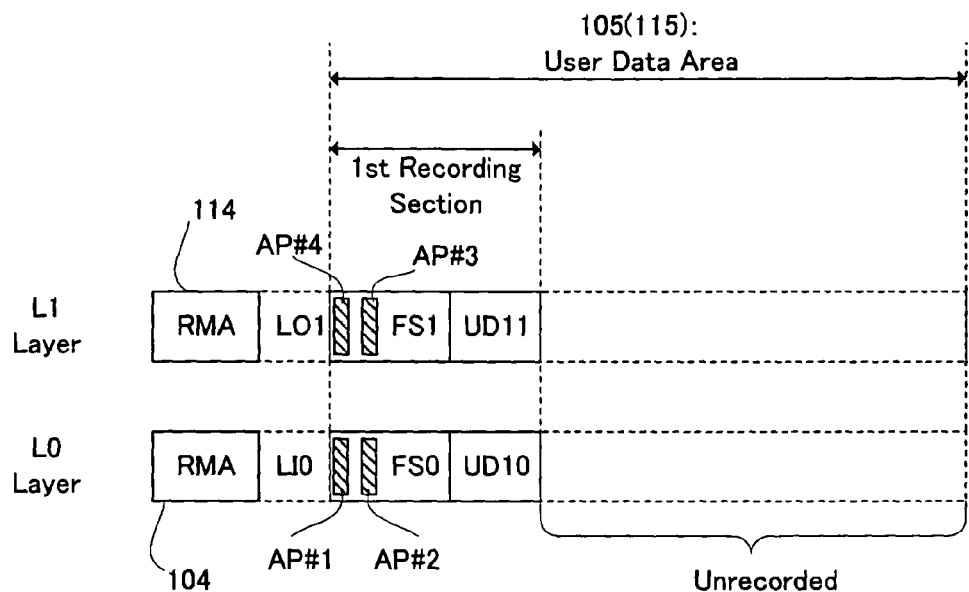
[FIG. 10]
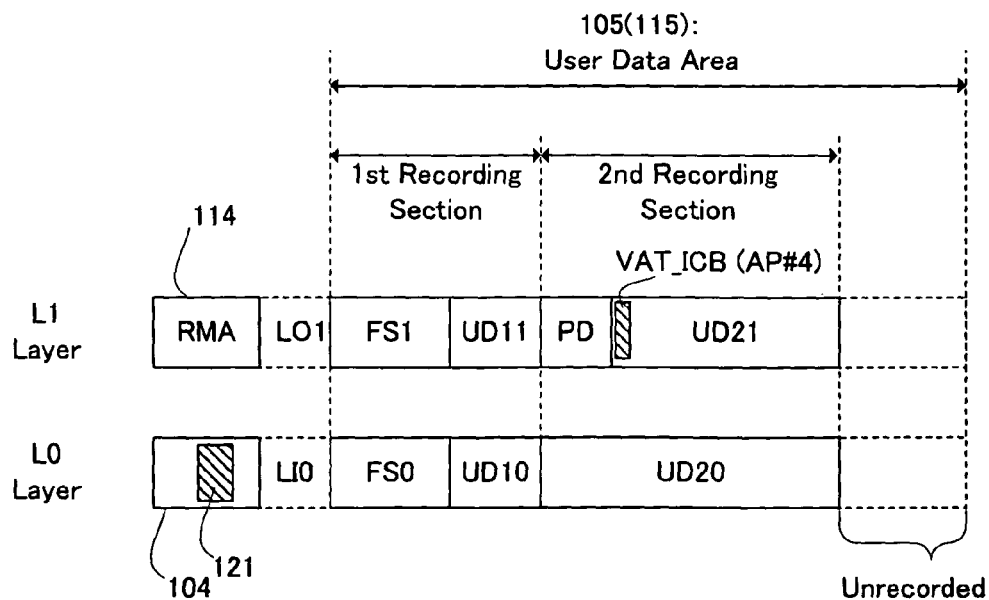

[FIG. 11]
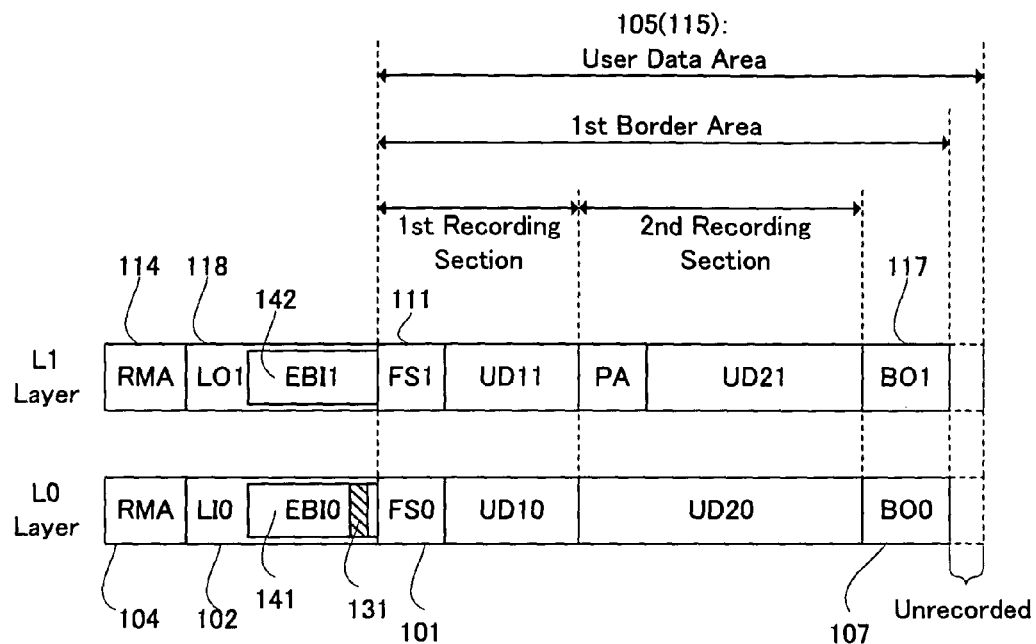
[FIG. 12]
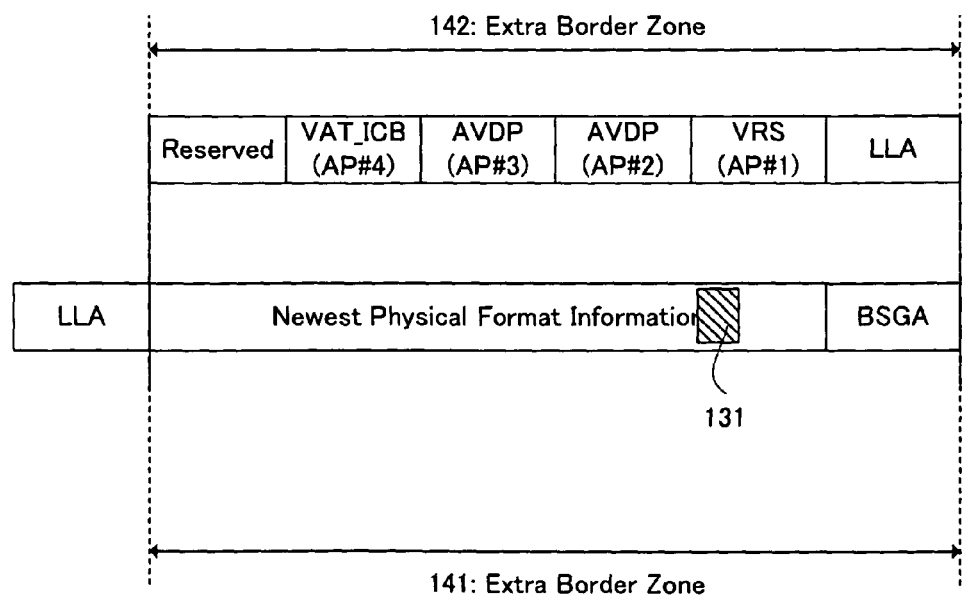

[FIG. 13]
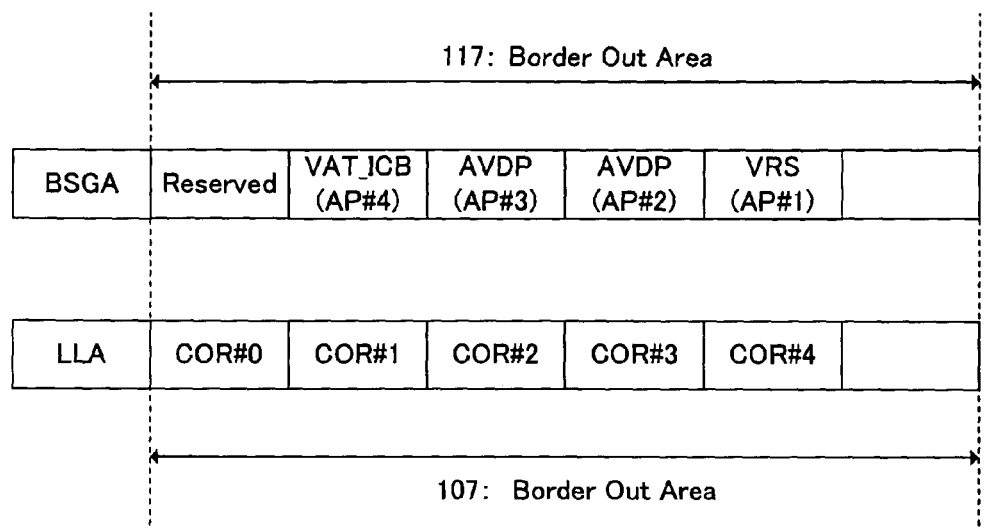

[FIG. 14]
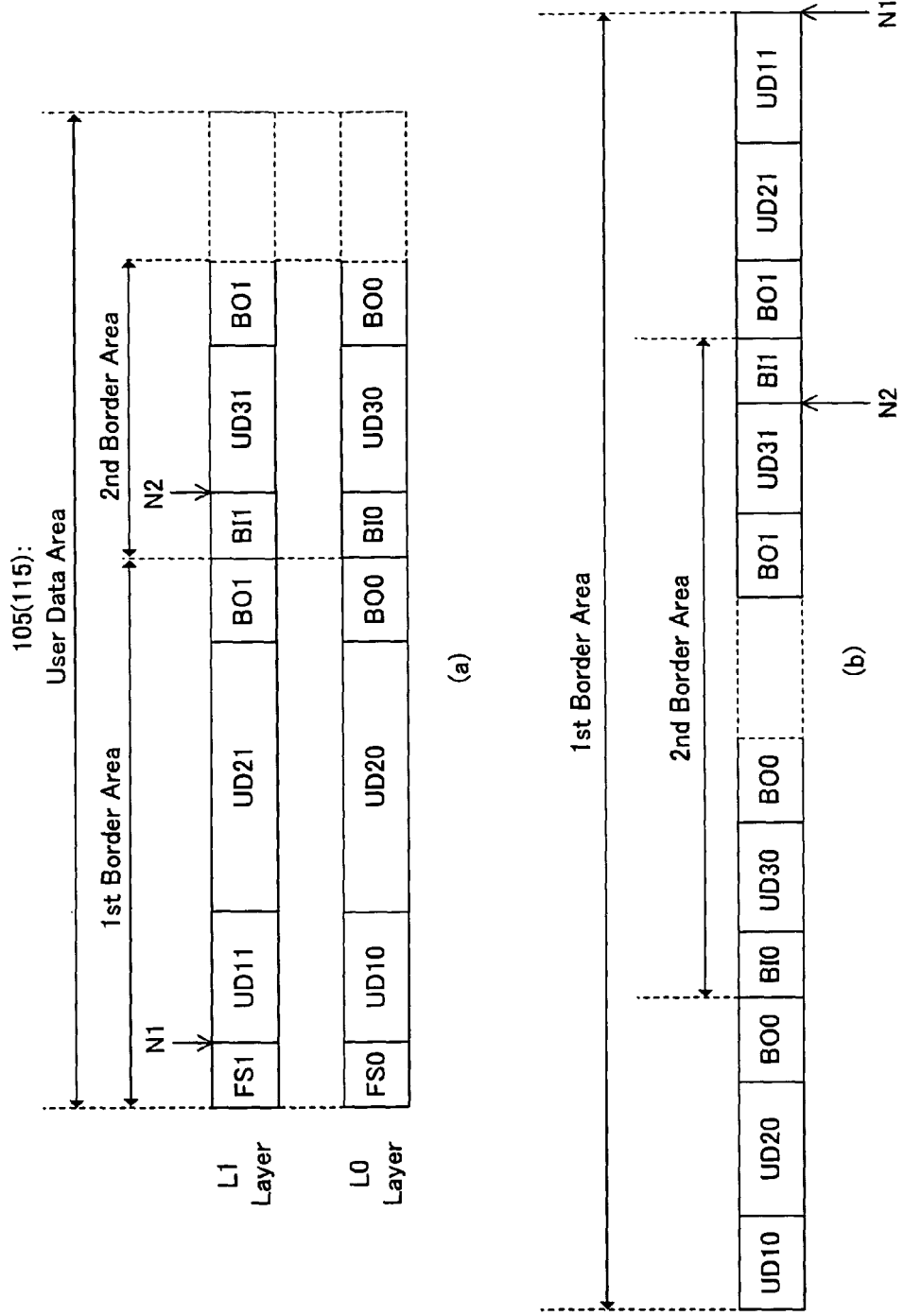

[FIG. 15]
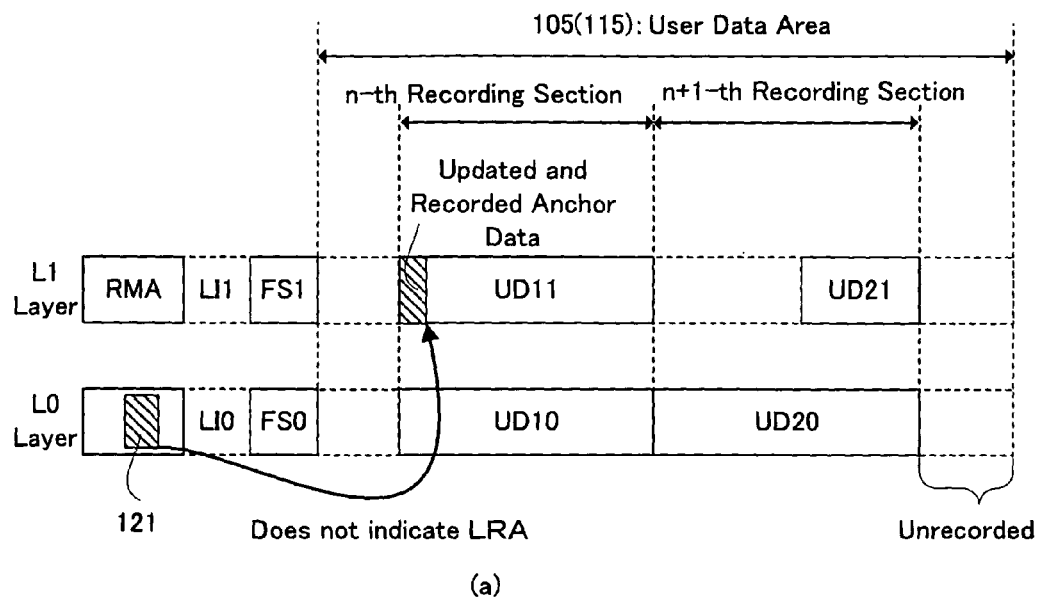
(a)
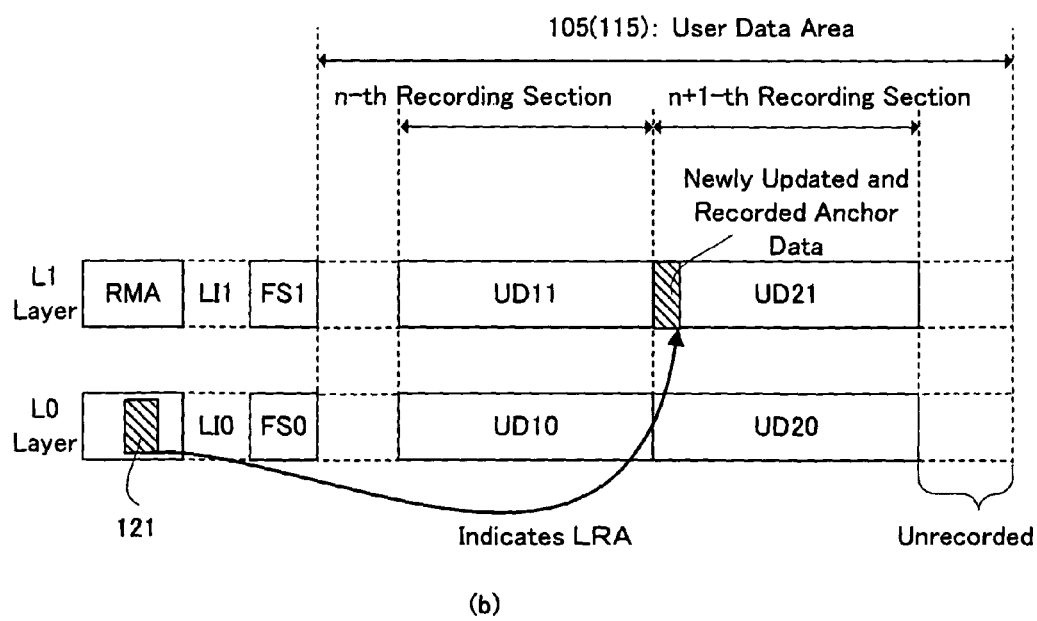
(b)

[FIG. 16]
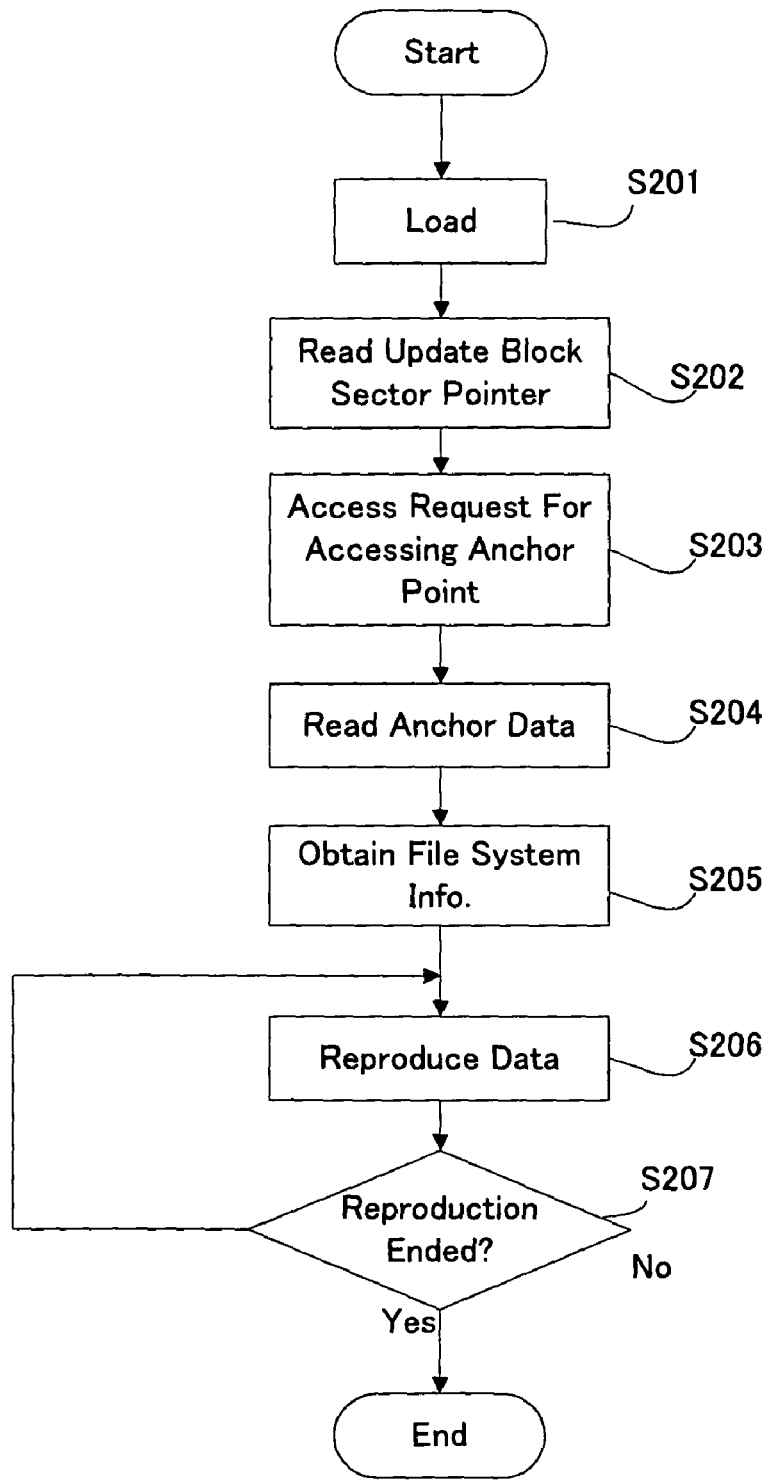

[FIG. 17]

| Byte Position | Content | |
|---|---|---|
| 0 to 3 | Update Block Original Sector Address (AP#1) | ⎫ |
| 4 to 7 | Update Block Original Sector Address (AP#2) | ⎬ 122 |
| 8 to 11 | Update Block Original Sector Address (AP#3) | |
| 12 to 15 | Update Block Original Sector Address (AP#4) | ⎭ |
| 16 to 19 | Update Block Sector Pointer (AP#1) | ⎫ |
| 20 to 23 | Update Block Sector Pointer (AP#2) | ⎬ 121 |
| 24 to 27 | Update Block Sector Pointer (AP#3) | |
| 28 to 31 | Update Block Sector Pointer (AP#4) | ⎭ |
| 32 to 35 | Start Sector No. (Border Out #1) | |
| 36 to 39 | Start Sector No. (Border Out #2) | |
| 40 to end | Other | |

INFORMATION RECORDING MEDIUM, INFORMATION RECORDING APPARATUS AND METHOD, INFORMATION REPRODUCING APPARATUS AND METHOD, AND COMPUTER PROGRAM

TECHNICAL FIELD

The present invention relates to an information recording medium, such as a DVD, an information recording apparatus and method, such as a DVD recorder, an information reproducing apparatus and method, such as a DVD player, and a computer program which makes a computer function as the information recording apparatus or the information reproducing apparatus.

BACKGROUND ART

For example, in the information recording medium, such as an optical disc, like a CD-ROM (Compact Disc-Read Only Memory), a CD-R (Compact Disc-Recordable), a DVD-ROM and the like, there are developed a multi-layer type (i.e. a dual layer type optical disc and so on), in which a plurality of recording layers are laminated on the same substrate. More specifically, such a dual layer type optical disc has a first recording layer (referred to as a "L0 layer" in this application), as the first layer, which is located on the front (i.e. a side closer to an optical pickup) as viewed from a laser light emission side in recording information by the information recording apparatus, and further has a semi-transparent reflective coating or film, located on the rear thereof (i.e. a side farther from the optical pickup). As the second recording layer, it has a second recording layer (referred to as a "L1 layer" in this application), located on the rear of the semi-transparent reflective coating through a middle layer, such as an adhesive layer, and further has a reflective film located on the rear thereof. In preparing such a dual layer type information recording medium, the L0 layer and the L1 layer are individually formed and pasted in the end, to thereby prepare the dual layer type optical disc at a low cost.

In the information recording apparatus, such as a CD recorder and a DVD recorder, for recording information onto such a dual layer type optical disc, the record information is recorded into the L0 layer in a rewritable method or irreversible change recording method, by focusing (or irradiating) the laser light for recording onto the L0 layer. The record information is recorded into the L1 layer in a rewritable method or irreversible change recording method, by focusing the laser light onto the L1 layer.

Patent document 1: Japanese Patent Application Laid Open NO. 2002-352469

DISCLOSURE OF INVENTION

Subject to be Solved by the Invention

In such a dual layer type optical disc, generally at first, the record information is recorded into the L0 layer. After the record information is recorded in the entire L0 layer, the record information is recorded into the L1 layer. Therefore, there arises such a situation that the record information is recorded in the entire L0 layer, while the record information is recorded only in one portion of the L1 layer. If a finalize process is performed in such a situation to reproduce the record information on the optical disc on an existing CD-ROM player, an existing DVD-ROM player or the like, it is necessary to record dummy information in another portion of the L1 layer in which the record information is not recorded. Thus, there is a technical problem that it takes more time to perform the finalize process, as compared to the data size of the record information actually recorded into the optical disc.

Thus, a recording method, which records the record information into the L0 layer and the L1 layer alternately (or in order to substantially uniform the data size of the record information recorded into each layer), may be conceived. Adopting such recording method, however, causes a new technical problem that an information recording/reproducing apparatus or the like can hardly or cannot recognize the record information, properly. This is caused by that a change of the address of a recording area in which the record information to be read (hereinafter referred to as "anchor information" in the present invention) is recorded in order to read various control information (hereinafter referred to as "file system information" in the present invention) for controlling the recording and/or reproduction of the record information, cannot be recognized because of adopting the above-mentioned recording method.

In order to solve the above-mentioned conventional problems, it is therefore an object of the present invention to provide an information recording medium which enables the record information to be preferably recorded onto the information recording medium having a plurality of recording layers, for example, as well as an information recording apparatus and method, an information reproducing apparatus and method, and a computer program which makes a computer function as the information recording apparatus or the information reproducing apparatus.

Means for Solving the Subject (Information Recording Medium)

The above object of the present invention can be achieved by an information recording medium, provided with: a first recording layer and a second recording layer in which record information can be alternately recorded, at least one of the first recording layer and the second recording layer provided with: an anchor area which is to record therein anchor information which is referred to in reading file system information for controlling at least one of recording and reproduction of the record information; and an update area to update-record (i.e. newly record) therein the anchor information.

According to the information recording medium of the present invention, the record information can be recorded in each of the first recording layer and the second recording layer. The record information can be alternately recorded in the first recording layer and the second recording layer. More preferably, the record information can be alternately recorded in the first recording layer and the second recording layer so that a recording area in which the record information is already recorded expands almost uniformly or equally in both the first recording layer and the second recording layer. For example, if the record information is recorded into a part of the recording area of the first recording layer, the record information is recorded into a part of the recording area of the second recording layer facing the part of the recording area of the first recording layer. The term "face" has a wide concept, including not only a case where a part of the first recording layer corresponds to a part of the second recording layer (namely, a case where that the former has an address with the same position relationship as the latter), but also a case where the former has an address which can be substantially equated with that of the latter, and further including a relationship between a part of the first recording layer and a part of the second recording layer in consideration of an eccentricity or the like, as described later.

Particularly, in the present invention, at least one of the first recording layer and the second recording layer is provided with: the anchor area; and the update area. The anchor area is a recording area which is referred to (more specifically, which is firstly referred to) in reading the file system information for controlling at least one of the recording and the reproduction of the record information. In the anchor area, the anchor information which is necessary to read the file system information is recorded. Moreover, the update area is a recording area to update-record therein the anchor information. For example, if it is necessary to update-record the anchor information into a place other than the anchor area, the anchor information is recorded into the update area. In other words, the anchor information in the present invention is update-recorded in a recording area other than the anchor area. Namely, the update area can function as a new (updated) anchor area. Incidentally, the update area is not necessarily clearly defined on the first recording layer or the second recording layer in advance. If the anchor information is recorded in a recording area in place of the anchor area, the recording area can function as the update area in the present invention.

As described above, in the present invention, the anchor information is update-recorded. Thus, it is possible to record the anchor information into a proper recording area, even if the record information is recorded in any aspect. In other words, it is possible to record the anchor information into the update area from which an information recording apparatus or an information reproducing apparatus, described later, can properly read the anchor information. Generally, if the record information is alternately recorded into the first recording layer and the second recording layer, such a situation likely occurs that the information recording apparatus or the information reproducing apparatus cannot recognize the anchor area. This is because, as discussed in detail in the embodiment later with using drawings, a change in the address value of the record information on a logical address space cannot be recognized, for example. Namely, if it is constructed such that the anchor area with a merely fixed address value is accessed in order to read the anchor information, there is a possibility that the anchor information cannot be read. As a result, it is impossible to preferably record and reproduce the record information.

Even in such a case, according to the present invention, since the anchor information is update-recorded into the update area, the information recording apparatus or the information reproducing apparatus described later can properly read the anchor information by referring to the update area in which the address value can be clearly recognized. In other words, without the update area, it is unclear which recording area is to be referred to in order to read the anchor information. However, in the present invention, since the anchor information is update-recorded into the update area, it is possible to properly read the anchor information. As a result, it is possible to preferably read the file system information, and it is possible to preferably record and reproduce the data.

Consequently, according to the information recording medium of the present invention, there is a great advantage that the recording information can be preferably recorded on the information recording medium having the plurality of recording layers.

In one aspect of the information recording medium of the present invention, the update area is included in a user area to record therein the record information.

According to this aspect, it is possible to update record the anchor information by using one portion of the user area having a relatively large size. In other words, the anchor information can be update-recorded into the desired recording area of the user area, so that it is possible to perform the recording or the like of the record information, more flexibly, without giving a special restriction to a user.

In another aspect of the information recording medium of the present invention, the update area is included in a border management area to manage a border area which is a recording unit by which the record information is alternately recorded.

According to this aspect, it is possible to record the anchor information by using one portion of the border management area. In particular, if the anchor information is recorded into the border management area having a relatively small size, it is unnecessary to perform a relatively troublesome search operation or the like, in reading the anchor information. Moreover, if the anchor information is recorded into a fixed recording area in the border management area, it is possible to read the anchor information, relatively easily and quickly, without reference to pointer information or the like, described later.

In another aspect of the information recording medium of the present invention, at least one of the first recording layer and the second recording layer is provided with a pointer recording area to record therein pointer information which indicates an address value of the update area in which the anchor information is update-recorded.

According to this aspect, it is possible to read the anchor information which is update-recorded in the update area, relatively easily, by referring to the pointer information to be recorded in the pointer recording area. Moreover, since the pointer information merely includes the address value of the update area in which the anchor information is update-recorded, it is enough if the pointer information is selectively referred to in the case that it is necessary to read the anchor information. In other words, since it hardly influences the normal recording operation and reproduction operation of the record information, there is such an advantage that there is little chance to increase the processing load of the information recording apparatus and the information reproducing apparatus.

In an aspect of the information recording medium provided with the pointer recording area as described above, the pointer recording area is included in a recording management area to manage the recording of the record information.

By virtue of such construction, it is possible to preferably read the pointer information from the recording management area.

In another aspect of the information recording medium of the present invention, at least one of the first recording layer and the second recording layer is provided with a flag area to record therein an update flag which indicates whether or not the anchor information is update-recorded into the update area.

According to this aspect, it is possible to recognize whether the anchor information is recorded in the anchor area or the update area, relatively easily, by referring to the update flag.

In an aspect of the information recording medium provided with the flag area as described above, the flag area is included in a border management area to manage a border area which is a recording unit by which the record information is alternately recorded.

By virtue of such construction, it is possible to preferably read the update flag from the border management area.

In another aspect of the information recording medium of the present invention, it is further provided with a position information recording area to record therein position information which indicates a position of the anchor area.

According to this aspect, it is possible to preferably recognize the position of the anchor area. Moreover, since the position information indicates the position of the anchor area, it is possible to arbitrarily set the position of the anchor area, without limited to a fixed position.

(Information Recording Apparatus and Method)

The above object of the present invention can be also achieved by an information recording apparatus, provided with: a recording device for recording record information onto an information recording medium, comprising a first recording layer and a second recording layer in which the record information can be recorded; a first controlling device for controlling the recording device to record the record information alternately into the first recording layer and the second recording layer; and a second controlling device for controlling the recording device to update-record anchor information, which is recorded in anchor area as being a start point in reading file system information for controlling at least one of recording and reproduction of the record information and which is referred to in reading the file system information, into a recording area other than the anchor area of at least one of the first recording layer and the second recording layer as the record information.

According to the information recording apparatus of the present invention, by virtue of the operation of the recording device controlled by the first controlling device, it is possible to record the record information into the first recording layer or the second recording layer. The first controlling device particularly controls the recording device to record the record information alternately into the first recording layer and the second recording layer. More preferably, the record information is recorded in each recording layer so that the record information recorded into the first recording layer has an almost equal data size as that of the record information recorded into the second recording layer.

Particularly in the embodiment, by virtue of the operation of the recording device controlled by the second controlling device, it is possible to update-record the anchor data to be originally recorded in the anchor area as the default, into a recording area other than the anchor area (i.e. into the update area). In other words, it is possible to record the anchor information into the update area in which the reading can be preferably performed in accordance with an aspect of recording the record information. Therefore, there is such a great advantage that it is possible to preferably record the data on the information recording medium having the plurality of recording layers, as described above.

Incidentally, in response to the various aspects of the information recording medium of the present invention described above, the information recording apparatus of the present invention can adopt various aspects.

In one aspect of the information recording apparatus of the present invention, the second controlling device controls the recording device to update-record the anchor information into at least one portion of a user data area to record therein the record information.

According to this aspect, it is possible to update and record the anchor information by using one portion of the user area having a relatively large size. In other words, the anchor information can be update-recorded into the desired recording area of the user area, so that it is possible to perform the recording or the like of the record information, more flexibly, without giving a special restriction to a user.

In an aspect of the information recording apparatus in which the anchor information is recorded into one portion of the user data area as described above, the second controlling device controls the recording device to update-record the anchor information into the at least one portion of the user data area before closing a border area which is a recording unit by which the record information is alternately recorded.

By virtue of such construction, it is possible to update-record the anchor information to an arbitrary position in the user area having a relatively large size, in such a situation that the data structure in the border area is not determined yet. Therefore, it is possible to update-record the anchor information in a more flexible aspect, in accordance with an aspect of recording the record information.

In another aspect of the information recording apparatus of the present invention, the second controlling device controls the recording device to update-record the anchor information into a border management area to manage a border area which is a recording unit by which the record information is alternately recorded.

According to this aspect, it is possible to record the anchor information into the border management area having a relatively small size, so that it is unnecessary to perform a relatively troublesome search operation or the like, in reading the anchor information. Moreover, if it is constructed such that the anchor information is recorded into a fixed recording area in the border management area, it is possible to read the anchor information, relatively easily and quickly, without reference to pointer information or the like, described later.

In an aspect of the information recording apparatus in which the anchor information is recorded into the border management area, as described above, the second controlling device controls the recording device to update-record the anchor information into the border management area in closing the border area.

By virtue of such construction, it is possible to read the anchor information, without searching the user area having a relatively large size, or the like, for example, by referring to the border management area after closing the border area (i.e. after performing a border close process).

In another aspect of the information recording apparatus of the present invention, it is further provided with a third controlling device for controlling the recording device to record pointer information which indicates an address value of a recording area to which the anchor information is update-recorded.

According to this aspect, it is possible to read the anchor information which is update-recorded, relatively easily, by referring to the pointer information recorded by the operation of the recording device which is controlled by the third controlling device. Moreover, since the pointer information merely includes the address value of a recording area into which the anchor information is update-recorded, it is enough if the pointer information is selectively referred to in the case it is necessary to read the anchor information. In other words, since it hardly influences the normal recording operation and reproduction operation of the record information, there is such an advantage that there is little chance to increase the processing load of the information recording apparatus and the information reproducing apparatus.

In an aspect of the information recording apparatus provided with the third controlling device, as described above, the third controlling device controls the recording device to record the pointer information into a recording management area to manage the recording of the record information.

By virtue of such construction, it is possible to read the anchor information which is update-recorded in the update area, relatively easily, by referring to the pointer information recorded in the recording management area.

In an aspect of the information recording apparatus provided with the third controlling device, the second controlling device controls the recording device to update-record the anchor information into a recording area which follows a recording area in which the record information is already recorded, in completing the recording of the record information, and the information recording apparatus further comprises a judging device for judging whether or not the address value indicated by the pointer information is equal to an address value of a recording area in which the record information is lastly recorded.

By virtue of such construction, by virtue of the operation of the judging device, it is possible to judge whether or not the recording of the record information is completed, relatively easily. Discussing it specifically, for example, if the recording of the record information is completed in a certain recording section, the anchor information is update-recorded in accordance with the recording of the record information. At this time, the pointer information indicates the recording position of the anchor data which is update-recorded next to the lastly recorded record information. Thus, if the pointer information indicates the address value of the recording area of the lastly recorded record information, it means that the recording of the record information is completed. On the other hand, if the pointer information does not indicate the address value of the recording area of the lastly recorded record information, it means that the anchor information is not updated nor recorded yet, so that it is possible to judge that the record information is still being recorded.

In another aspect of the information recording apparatus of the present invention, it is further provided with a fourth controlling device for controlling the recording device to record an update flag which indicates whether or not the anchor information is update-recorded by the recording device.

According to this aspect, it is possible to recognize whether the anchor information is recorded in the anchor area or the update area, relatively easily, by referring to the update flag recorded by the operation of the recording device which is controlled by the fourth controlling device.

In an aspect of the information recording apparatus provided with the fourth controlling device, as described above, the fourth controlling device controls the recording device to record the update flag into a border management area to manage a border area which is a recording unit by which the record information is alternately recorded.

By virtue of such construction, it is possible to recognize whether the anchor information is recorded in the anchor area or the update area, relatively easily, by referring to the update flag recorded in the border management area. Incidentally, the update flag is preferably recorded into the border management area, in closing the border area.

The above object of the present invention can be also achieved by an information recording method in an information recording apparatus provided with: a recording device for recording record information onto an information recording medium, comprising a first recording layer and a second recording layer in which the record information can be recorded, the information recording method provided with: a first controlling process of controlling the recording device to record the record information alternately into the first recording layer and the second recording layer; and a second controlling process of controlling the recording device to update-record anchor information, which is recorded into anchor area as being a start point in reading file system information for controlling at least one of recording and reproduction of the record information and which is referred to in reading the file system information, into a recording area other than the anchor area of at least one of the first recording layer and the second recording layer as the record information.

According to the information recording method of the present invention, it is possible to receive the same various benefits as those of the above-mentioned information recording apparatus of the present invention.

Incidentally, in response to the various aspects of the information recording apparatus of the present invention described above, the information recording method of the present invention can adopt various aspects.

(Information Reproducing Apparatus and Method)

The above object of the present invention can be also achieved by an information reproducing apparatus for reproducing the record information recorded on the information recording medium by the above-mentioned information recording apparatus of the present invention (including its various aspects), the information reproducing apparatus provided with: a first reading device for reading the anchor information which is recorded in the anchor area or which is update-recorded into the recording area other than the anchor area of at least one of the first recording layer and the second recording layer; a second reading device for reading the file system information on the basis of the read anchor information; and a reproducing device for reproducing the record information on the basis of the read file system information.

According to the information reproducing apparatus of the present invention, by virtue of the operation of the first reading device, it is possible to read the effective anchor information update-recorded, without reading the ineffective (or old) anchor information recorded in the anchor area as the default. Then, by virtue of the operation of the second reading device, it is possible to preferably read the file system information on the basis of the read anchor information. Then, by virtue of the operation of the reproducing device, it is possible to preferably reproduce the record information on the basis of the read file system information.

Incidentally, in response to the various aspects of the information recording apparatus of the present invention described above, the information reproducing apparatus of the present invention can adopt various aspects.

The above object of the present invention can be also achieved by an information reproducing method of reproducing the record information recorded on the information recording medium by the above-mentioned information recording apparatus of the present invention (including its various aspects), the information reproducing method provided with: a first reading process of reading the anchor information which is recorded in the anchor area or which is update-recorded into the recording area other than the anchor area of at least one of the first recording layer and the second recording layer; a second reading process of reading the file system information on the basis of the read anchor information; and a reproducing process of reproducing the record information on the basis of the read file system information.

According to the information reproducing method of the present invention, it is possible to receive the same various benefits as those of the above-mentioned information reproducing apparatus of the present invention.

Incidentally, in response to the various aspects of the information reproducing apparatus of the present invention described above, the information reproducing method of the present invention can adopt various aspects.

(Computer Program)

The above object of the present invention can be also achieved by a first computer program for record control to control a computer provided for the above-mentioned information recording apparatus (including its various aspects), the computer program making the computer function as at least one portion of the first controlling device and the second controlling device.

The above object of the present invention can be also achieved by a second computer program for reproduction control to control a computer provided for the above-mentioned information reproducing apparatus (including its various aspects), the computer program making the computer function as at least one portion of the first reading device, the second reading device, and the reproducing device.

According to each of the computer programs of the present invention, the above-mentioned information recording apparatus or information reproducing apparatus of the present invention can be relatively easily realized as a computer reads and executes the computer program from a program storage device, such as a ROM, a CD-ROM, a DVD-ROM, and a hard disk, or as it executes the computer program after downloading the program through a communication device.

Incidentally, in response to the various aspects of the information recording apparatus or information reproducing apparatus of the present invention described above, each of the computer programs of the present invention can adopt various aspects.

The above object of the present invention can be also achieved by a first computer program product in a computer-readable medium for tangibly embodying a program of instructions executable by a computer provided in the above-mentioned information recording apparatus of the present invention (including its various aspects), to make the computer function as at least one of the first controlling device and the second controlling device.

The above object of the present invention can be also achieved by a second computer program product in a computer-readable medium for tangibly embodying a program of instructions executable by a computer provided in the above-mentioned information reproducing apparatus of the present invention (including its various aspects), to make the computer function as at least one of the first reading device, the second reading device, and the reproducing device.

According to each of the computer program products of the present invention, the above-described information recording apparatus or information reproducing apparatus of the present invention can be embodied relatively readily, by loading the computer program product from a recording medium for storing the computer program product, such as a ROM (Read Only Memory), a CD-ROM (Compact Disc—Read Only Memory), a DVD-ROM (DVD Read Only Memory), a hard disk or the like, into the computer, or by downloading the computer program product, which may be a carrier wave, into the computer via a communication device. More specifically, the computer program product may include computer readable codes to cause the computer (or may comprise computer readable instructions for causing the computer) to function as the above-described information recording apparatus or information reproducing apparatus.

These effects and other advantages of the present invention become more apparent from the following embodiments.

As explained above, in the information recording medium of the present invention, at least one of the first and second recording layers is provided with the anchor area and the update area. Therefore, particularly, even if the recording information is alternately recorded on the information recording medium having the plurality of recording layers, it is possible to preferably record the record information.

Moreover, the information recording apparatus of the present invention is provided with the recording device, the first controlling device, and the second controlling device.

The information recording method of the present invention is provided with the first controlling process and the second controlling process. Therefore, particularly, even if the recording information is alternately recorded on the information recording medium having the plurality of recording layers, it is possible to preferably record the record information.

Furthermore, the information reproducing apparatus of the present invention is provided with the first reading device, the second reading device, and the reproducing device. The information reproducing method of the present invention is provided with the first reading process, the second reading process, and the reproducing process. Therefore, it is possible to preferably reproduce the record information recorded on the information recording medium.

BRIEF DESCRIPTION OF DRAWINGS

[FIG. 1] FIG. 1 are a substantial plan view showing the basic structure of an optical disc having a plurality of recording areas in an embodiment of an information recording medium of the present invention, and a schematic cross sectional view of the optical disc and a corresponding conceptual diagram showing a recording area structure in the radial direction.

[FIG. 2] FIG. 2 is an explanatory diagram conceptually showing an aspect of the recording of data onto the optical disc in the embodiment.

[FIG. 3] FIG. 3 is a data structural view conceptually showing the data structure of an update block sector pointer to be recorded into a RMA.

[FIG. 4] FIG. 4 is a table showing the address value of an anchor point as default and the content of data recorded there.

[FIG. 5] FIG. 5 are data structural views actually showing the anchor point as the default shown in FIG. 4, on the optical disc.

[FIG. 6] FIG. 6 is a data structural view conceptually showing the data structure of an update block sector effective flag.

[FIG. 7] FIG. 7 is a block diagram conceptually showing the basic structure of an information recording/reproducing apparatus in an embodiment of the present invention.

[FIG. 8] FIG. 8 is a flowchart conceptually showing an entire flow of the recording operation of the information recording/reproducing apparatus in the embodiment.

[FIG. 9] FIG. 9 is a data structural view showing one procedure of the recording operation.

[FIG. 10] FIG. 10 is a data structural view showing another procedure of the recording operation.

[FIG. 11] FIG. 11 is a data structural view showing another procedure of the recording operation.

[FIG. 12] FIG. 12 is a data structural view conceptually showing the data structure of a border-in area or extra border-in area.

[FIG. 13] FIG. 13 is a data structural view conceptually showing the data structure of a border-out area.

[FIG. 14] FIG. 14(a) and FIG. 14(b) are data structural views showing the data on the optical disc which is recognized by an information recording/reproducing apparatus in a comparison example.

[FIG. 15] FIG. 15 are explanatory diagrams showing an aspect of an operation of judging whether or not the data is completely recorded in a recording section.

[FIG. 16] FIG. 16 is a flowchart conceptually showing an entire flow of the reproduction operation of the information recording/reproducing apparatus in the embodiment.

[FIG. 17] FIG. 17 is a data structural view showing the data structure of one portion of RMD of an optical disc in a modified example.

DESCRIPTION OF REFERENCE CODES

100 Optical disc
101, 111 File system information
102 Lead-in area
104, 114 RMA
105, 115 User data area
106, 116 Border-in area
107, 117 Border-out area
118 Lead-out area
109, 119 Middle area
121 update block sector pointer
122 update block original sector address
131 update block sector effective flag
141, 142 Extra border-in area
200 Information recording/reproducing apparatus
352 Optical pickup
353 Recording/reproducing device
354, 359 CPU
400 Host computer Best Mode for Carrying Out the Invention Hereinafter, the best mode for carrying out the present invention will be discussed in order for each embodiment, with reference to the drawings.

Embodiments of the present invention will be explained hereinafter with reference to the drawings.

(Embodiment of the Information Recording Medium)

At first, with reference to FIGS. 1 to FIG. 6, an embodiment according to the information recording medium of the present invention will be discussed.

At first, with reference to FIGS. 1, the basic structure of an optical disc in the embodiment of the recording medium of the present invention will be discussed. FIG. 1(a) is a substantial plan view showing the basic structure of an optical disc having a plurality of recording areas in the embodiment of the information recording medium of the present invention, and FIG. 1(b) is a schematic cross sectional view of the optical disc and a corresponding conceptual diagram showing a recording area structure in the radial direction.

As shown in FIG. 1(a) and FIG. 1(b), an optical disc 100 has a recording surface on a disc main body with a diameter of about 12 cm, as is a DVD. On the recording surface, the optical disc 100 is provided with: a lead-in area 102 and a lead-out area 118; user data areas 105 and 115; and middle areas 109 and 119, with a center hole 101 as the center. Then, for example, on a transparent substrate 110 of the optical disc 100, there are laminated recording layers and the like. In each recording area of the recording layers, tracks, such as groove tracks and land tracks, are alternately placed, spirally or concentrically, with the center hole 101 as the center. On the track, data is divided and recorded by a unit of ECC block. The ECC block is a data management unit by a pre-format address in which record information is error-correctable.

Incidentally, the present invention is not particularly limited to the optical disc having these three areas. For example, even if the lead-in area 102, the lead-out area 118 or the middle area 109 (or 119) does not exist, a data structure explained below can be constructed. Moreover, as described later, the lead-in area 102, the lead-out area 118 or the middle area 109 (or 119) may be further segmentized.

Particularly, the optical disc 100 in the embodiment, as shown in FIG. 1(b), has such a structure that a L0 layer which constitute one example of the "first recording layer" of the present invention and a L1 layer which constitute one example of the "second record layers" of the present invention are laminated on the transparent substrate 110. Upon the recording and reproduction of such a two-layer type optical disc 100, the recording and reproduction in the L0 layer or the L1 layer is performed, depending on which recording layer has the focus position of laser light LB, irradiated from the lower to upper side in FIG. 1(b). In particular, the data is recorded from the inner to the outer side in the L0 layer, and the data is recorded from the outer to the inner side in the L1 layer. In other words, the optical disc 100 in the embodiment corresponds to an optical disc in an opposite track path manner.

Moreover, the optical disc 100 in the embodiment is provided with: PCAs (Power Calibration Areas) 103 and 113; and RMAs (Recording Management Areas) 104 and 114, on the inner side of each of the lead-in area 102 and the lead-out area 118.

The PCAs 103 and 113 are recording areas to perform an OPC (Optimum Power Control) process of adjusting (i.e. calibrating) the laser power of laser light LB in recording the data onto the optical disc 100. An OPC pattern is recorded into the PCAs 103 and 113 with changing the laser power gradually, and the reproduction quality (e.g. asymmetry, etc.) of the recorded OPC pattern is measured, to thereby calculate an optimum laser power in recording the data.

The RMAs 104 and 114 are recording areas to record therein various management information for managing the recording of the data onto the optical disc 100.

Moreover, the optical disc 100 in the embodiment is not limited to a two-layer single sided type, i.e., a dual layer type, but may be a two-layer double sided type, i.e., a dual layer double sided type. Furthermore, the optical disc 100 in the embodiment is not limited to the optical disc having the two recording layers, as described above, but may be an optical disc of a multilayer type which has three or more layers.

Next, with reference to FIG. 2, an aspect of the recording of data onto the optical disc 100 in the embodiment will be discussed in more details. FIG. 2 is an explanatory diagram conceptually showing the aspect of the recording of the data onto the optical disc in the embodiment.

As shown in FIG. 2, the optical disc 100 has two recording layers (i.e. the L0 layer and the L1 layer). The L0 layer is provided with: the lead-in area 102; and the middle area 109. The L1 layer is provided with: the lead-out area 118; and the middle area 119. In particular, in the optical disc 100 in the embodiment, there are a plurality of border areas in the user data area 105 in the L0 layer and the user data area 115 in the L1 layer. Then, various content data, such as movie data, audio data, and other various data are recorded by a unit of the border area. In other words, for example, some movie data (or file) is recorded into a first border area. For example, some audio data (or file) is recorded into a second border area. For example, some data for PC (or file) is recorded into a third border area.

Discussing the border area in more detail, each border area is provided with: border-in areas 106 and 116; user data areas 105 and 115; and border-out areas 107 and 117. However, in the first border area next to the lead-in area 102, since file system information 101 and 111 is recorded at the most inner circumferential side thereof, the border-in areas 106 and 116 are not provided. Namely, the first border area includes the file system information 101 and 111, user data areas 105a and 115a; and border-out areas 107a and 117a. The second border area includes border-in areas 106b and 116b, user data areas 105b and 115b; and border-out areas 107b and 117b.

The third border area includes border-in areas 106c and 116c, user data areas 105c and 115c; and border-out areas 107c and 117c.

The border-in areas 106 and 116 are one specific example of the "border management area" of the present invention. The border-in areas 106 and 116 are recording areas to record therein various management information (e.g. newest or updated physical format information described later, etc.) for managing the data recorded in each border area, and have a size of about several μm in the radial direction of the optical disc 100, for example. The border-in areas 106 and 116 will be discussed in detail later (refer to FIG. 3 and so on).

The user data areas 105 and 115 are areas to actually record therein content data and other various data. In the embodiment, the size of the user data areas 105 and 115 may be determined in advance. Or the size of the user data areas 105 and 115 may be changed as occasion demands in accordance with the recording aspect of the data. The user data areas 105 and 115 included in the same border area preferably have such a relationship that they are disposed at the same position or substantially the same position, as viewed from an optical pickup's side. In other words, the user data areas 105 and 115 are preferably recording areas having the address corresponding to each other.

The border-out areas 107 and 117 are one specific example of the "border management area" of the present invention. The border-out areas 107 and 117 are recording areas to record therein various management information for managing the data recorded in each border area, and have a size of about 100 μm to 500 μm in the radial direction of the optical disc 100, for example. The border-out areas 107 and 117 will be discussed in detail later (refer to FIG. 3 and so on).

The content data and the various data are recorded into the first border area, the second border area, and the third border area, in this order. Then, in each border area, the data is recorded from the inner circumferential side to the outer circumferential side in the user data area 105 in the L0 layer, as shown with an arrow in FIG. 2, and then recorded from the outer circumferential side to the inner circumferential side in the user data area 115 in the L1 layer. Moreover, even in each border area, the further segmentized recording section may be defined, and the data may be recorded by a unit of the segmentized recording section.

In particular, in the case of the optical disc in such an aspect that the data is recorded into the L1 layer after recorded into the whole L0 layer, the data may be hardly recorded in the L1 layer, which causes such a technical problem that it takes relatively longer time to finalize, as compared to the amount of data recorded on the whole optical disc, because the data is recorded in the whole L0 layer. This is because it needs a time length to record the dummy data into an area in which the data is not recorded in the L1 layer. However, according to the embodiment, the various data is recorded by a unit of border area, so that it is possible to record the data, substantially uniformly, into each of the L0 layer and the L1 layer. Therefore, it is unnecessary to record the much dummy data in the L1 layer, as described above. In other words, on the outer circumferential side of the middle areas 109 and 119, an unrecorded state (or mirror state) can be admissible. Thus, it is possible to reduce the time length for the finalize process, so that it is possible to contribute the reduction of a recording operation time, the improvement of the comfortableness of a user, and the like.

Incidentally, the border-out areas 107 and 117 are disposed in the L0 layer and the L1 layer, respectively, at a point where the recording layer to record the data is changed from the L0 layer to the L1 layer. By providing the border-out areas 107 and 117 at this point, it is possible to prevent a penetration (i.e. a flying-over) of an optical pickup which searches for a predetermined recording position on the optical disc 100 (or the penetration of the laser light irradiated from the optical pickup). The "penetration" herein indicates that in the case where the optical disc 100 is provided only with the first border area, when the user data area 105a is searched, the search destination jumps out of the user data area 105a into a recording area in which the data is unrecorded (e.g. the mirror area). This type of penetration of the optical pickup may cause the runaway of the subsequent recording operation and reproduction operation, which is not preferable. However, according to the embodiment, since the border-out areas 107 and 117 are provided, it is possible to properly prevent the penetration. In addition, by virtue of the border-out areas 107 and 117, it is possible to prevent the laser light from entering a recording area in which the data is unrecorded, after layer jump, caused by a discrepancy in pasting and an eccentricity between the two recording layers, or a discrepancy of the irradiation position of the laser light, in performing the "layer jump" which is a change operation of changing the recording layer targeted for recording, between the L0 layer and the L1 layer.

Moreover, in consideration of the eccentricity and the like, for example, it may be constructed to make the size of the user data area 105 in the L0 layer larger than the size of the user data area 115 in the L1 layer. Particularly, it is preferable to make the size of the user data area 105 in the L0 layer larger than the size of the user data area 115 in the L1 layer so that the user data area 115 in the L1 layer is disposed only at a position facing to the user data area 105 in the L0 layer. By this, if the data is recorded into the L1 layer, the laser light can be always irradiated through the L0 layer in which the data is recorded, so that it is possible to improve recording features.

Next, with reference to FIG. 3 to FIG. 6, the more detailed data structure of the optical disc 100 in the embodiment will be discussed. FIG. 3 is a data structural view conceptually showing the data structure of an update block sector pointer to be recorded into the RMA 104 (or 114). FIG. 4 is a table showing the address value of an anchor point as default and the content of data recorded there. FIG. 5(*a*) and FIG. 5(*b*) are data structural views actually showing the anchor point as the default shown in FIG. 4, on the optical disc 100. FIG. 6 is a data structural view conceptually showing the data structure of an update block sector effective flag.

As shown in FIG. 3, update block sector pointers (AP#1 to #4) 121, which constitute one specific example of the "pointer information" of the present invention, and so on are recorded in the RMA 104 (or 114). Discussing the format of a DVD, which is one specific example of the optical disc 100, as an example, the update block sector pointers 121 are recorded in a recording area with byte positions of "0" to "15" in a field 3 of RMD (Recording Management Data) recorded in the RMA 104 (or 114). Incidentally, in the field 3 of the RMD, the start sector numbers of the border-out area 107 and 117 in the respective L0 layer and L1 layer is recorded, in addition to the update block sector pointers 121.

The update block sector pointer 121 is pointer information indicating the address value of a recording area, in which such anchor data (more specifically effective anchor data) that is read by an information recording/reproducing apparatus described later for the first time in order to read the file system information 101 (or 111), is recorded. In other words, the information recording/reproducing apparatus described later can read the file system information after reading the anchor data, to thereby record and reproduce the data. Each update block sector pointer 121 has a size of 4 bytes. The recording area in which the anchor data is recorded is referred to as an anchor point (referred to as an "AP", as occasion demands) and discussed below:

As for the anchor point, a UDF (Universal Disc Format) is explained as a specific example, which is a standard with which a DVD complies. For example, four recording areas shown in FIG. 4 are given as the specific example of the anchor point as default. Incidentally, the explanation about the general UDS standard will be omitted. As for the explanation about the standard, please refer to UDF Specification (Revision 2.50) issued by OSTA (Optical Storage Technology Association).

As shown in FIG. 4, a recording area with a logical block address (LBA) of "16h" (hereinafter referred to as an "AP#1", as occasion demands), a recording area with a logical block address (LBA) of "256h" (hereinafter referred to as an "AP#2", as occasion demands), a recording area with a logical block address (LBA) of "LRA (Last Recorded Address)—256h" (hereinafter referred to as an "AP#3", as occasion demands), and a recording area with a logical block address (LBA) of "LRA" (hereinafter referred to as an "AP#4", as occasion demands) are given as one specific example of the anchor point as the default. Incidentally, the LRA herein corresponds to a logical block address with a maximum value, out of the logical block addresses of the recording area in which the data is already recorded. Then, for example, a VRS (Volume Recognition Sequence) is recorded as the anchor data in the AP#1, an ADVP (Anchor Volume Description Pointer) is recorded as the anchor data in the AP#2 and the AP#3, and a VAT_ICB (Virtual Allocation Table ICB) is recorded as the anchor data in the AP#4.

The recording area of the anchor point as the default shown in FIG. 4 on the actual optical disc 100 will be discussed, with reference to FIGS. 5.

FIG. 5(*a*) shows the optical disc 100 on which the data is recorded in the first border area. Namely, in the L0 layer of the first border area, the file system information (FSO) 101 (or one portion thereof) and user data (UD 10) are recorded, and the border-out area (BO10) 107 is formed. Moreover, in the L1 layer of the first border area, the file system information (FS1) 111 (or one portion thereof) and user data (UD 11) are recorded, and the border-out area (BO11) 117 is formed. Furthermore, if the data cannot be recorded in the entire first border area (i.e. until the end of the first border area), padding data (PD), such as "00h" data, is recorded into a space area in which the data is not recorded yet. At this time, recording areas shown by hatching in FIG. 5(*a*) correspond to the anchor points as the default described above. In other words, there are the AP#1 and the AP#2 as the default, in the recording area in which the FSO is recorded, and there are the AP#3 and the AP#4 as the default, in the recording area in which the FS1 is recorded.

Moreover, the optical disc 100 as shown in FIG. 5(*a*) is represented as shown in FIG. 5(*b*), on a disc volume space (logical block address space) recognized by the information recording/reproducing apparatus described later (in particular, a host computer). Namely, on the disc volume space in which a logical block address value primarily determines a position, the data is distributed on the end portions thereof. If the additional recording is performed in the second border area or the like on the optical disc 100, additionally recorded data is disposed on the disc volume space to distribute it between the data which are distributed on the end portions. In other word, additionally recorded data is disposed on the unrecorded area as shown in FIG. 5(*b*).

Then, if the additional recording is performed in the second border area or the like, the update block sector pointer (AP#1) 121 shown in FIG. 3 indicates the address value of the recording area in which the VRS, which is originally recorded in the AP#1 as the default, is update-recorded (i.e. the address value of the updated AP#1). In the same manner, the update block sector pointer (AP#2) 121 shown in FIG. 3 indicates the address value of the recording area in which the AVDP, which is originally recorded in the AP#2 as the default, is update-recorded (i.e. the address value of the updated AP#2). In the same manner, the update block sector pointer (AP#3) 121 shown in FIG. 3 indicates the address value of the recording area in which the AVDP, which is originally recorded in the AP#3 as the default, is update-recorded (i.e. the address value of the updated AP#3). In the same manner, the update block sector pointer (AP#4) 121 shown in FIG. 3 indicates the address value of the recording area in which the VAT_ICB, which is originally recorded in the AP#4 as the default, is update-recorded (i.e. the address value of the updated AP#4).

The anchor data is recorded in the anchor point having a predetermined logical address on the optical disc 100 as shown in FIG. 3, so that it can be considered that the anchor data can be read without reference to the update block sector pointer 121. However, if the data is recorded by a unit of the border area, as explained in FIG. 2, the anchor data can be recorded into a recording area other than the default anchor point which can be recognized by the information recording/reproducing apparatus. In other words, there is such a technical problem that the address value of the anchor point is changed by recording the data into the second border area, for example, so that the information recording/reproducing apparatus cannot properly recognize the anchor point which reflects the recording of the data into the second border area. This causes such a problem that it is impossible to read the anchor data recorded in each of the AP#1 to #4 (or it is impossible to recognize the anchor point), so that it is impossible to read the file system information 101 and 111. In the embodiment, even in such a case, it is possible to properly read the anchor data because each of the update block sector pointers (AP#1 to #4) 121 indicates the address value of a recording area in which the anchor data is update-recorded (which is a so-called updated anchor point). As a result, it is possible to read the file system information, preferably. The relevant operation will be discussed in detail in the explanation of the information recording/reproducing apparatus described later.

Obviously, the specific position (address value, etc.) of the anchor point, the quantity thereof, the type of the anchor data to be recorded there, and the like may be different from those illustrated in the embodiment, due to a difference in the standard with which the optical disc 100 complies. In association with that, the quantity of the update block sector pointers 121 to be recorded onto the optical disc 100 may be changed, as occasion demands. Moreover, it is not always necessary to read the whole anchor data shown in FIG. 4 in order to read the file system information 101 and 111. For example, in the case of the UDF, it is possible to read the file system information 101 and 111 if at least two of the anchor data shown in FIG. 4 can be read.

Moreover, on the optical disc 100, there area recorded update block sector effective flags (AP#1 to #4) 131, which constitute one specific example of the "update flag" of the present invention, as shown in FIG. 6. Discussing the format of a DVD, which is one specific example of the optical disc 100, as an example, the update block sector effective flags 131 are recorded in a recording area with a byte position of "41" of the newest or updated physical format information to be recorded into the border-in area 106 (or 116).

The update block sector effective flag 131 is a flag which indicates whether or not the update block sector pointer 121 indicates a recording area other than the default anchor point. In other words, it indicates whether or not the anchor data is update-recorded into the recording area other than the default anchor point. The update block sector effective flag (AP#1) 131 indicates whether or not the anchor data is recorded in a recoding area other than the AP#1 of the default (i.e. a recording area in which the logical block address corresponds to "16h"). The update block sector effective flag (AP#2) 131 indicates whether or not the anchor data is recorded in a recoding area other than the AP#2 of the default (i.e. a recording area in which the logical block address corresponds to "256h"). The update block sector effective flag (AP#3) 131 indicates whether or not the anchor data is recorded in a recoding area other than the AP#3 of the default (i.e. a recording area in which the logical block address corresponds to "LRA—256h"). The update block sector effective flag (AP#4) 131 indicates whether or not the anchor data is recorded in a recoding area other than the AP#4 of the default (i.e. a recording area in which the logical block address corresponds to "LRA").

For example, if the anchor data is recorded in the recording area other than the AP#1 of the default, the update block sector effective flag (AP#1) 131 indicates a flag "1" for indicating the fact. On the other hand, if the anchor data (more specifically, effective anchor data) is still recorded in the AP#1 of the default, the update block sector effective flag (AP#1) 131 indicates a flag "0" for indicating the fact.

The update block sector effective flag 131 is recorded into the recording area with a byte position of "41" of the newest physical format information to be recorded into the border-in area 106 (or 116), if a border close process is performed with respect to each border area. In parallel with this, the anchor data recorded in the AP#1 to #4 is recorded into the border-in area 116 and the border-out area 117, as described later. Incidentally, the border close process means a process of ending the recording of the data into the user data area 105 (or 115) and preparing the border-in area 106 (or 116) and the border-out area 107 (or 117).

By this, after the border close process is performed, it is possible to relatively easily recognize whether the anchor data is recorded in the default anchor point (i.e. the recording area of the anchor data is not updated from the default anchor point) or the anchor data is recorded in a recording area other than the default anchor point (i.e. the recording area of the anchor data is updated from the default anchor point). If the recording area of the anchor data is not updated, it is possible to read the anchor data from the default anchor point. On the other hand, if it is updated, it is possible to read the anchor data from the border-in area 116 and the border-out area 117. Namely, it is possible to preferably read the anchor data even on an information reproducing apparatus of a reproduce-only type which cannot recognize the RMA 104 (or 114) because it is unnecessary to refer to the update block sector pointer 121 recorded in the RMA 104 (or 114).

(Information Recording/Reproducing Apparatus)

Next, the structure and operation of an information recording/reproducing apparatus, which is an embodiment of the information recording apparatus and the information reproducing apparatus of the present invention, will be explained with reference to FIG. 7 to FIG. 17.

(1) Basic Structure

At first, with reference to FIG. 7, the basic structure of an information recording/reproducing apparatus 200 in the embodiment will be discussed. FIG. 7 is a block diagram conceptually showing the basic structure of the information recording/reproducing apparatus 200 in the embodiment. Incidentally, the information recording/reproducing apparatus 200 has a function of recording the record data onto the optical disc 100 and a function of reading the record data recorded on the optical disc 100.

As shown in FIG. 7, the information recording/reproducing apparatus 200 is provided with: a disc drive 300 onto which the optical disc 100 is actually loaded; and a host computer 400, such as a personal computer, for controlling the recording and reproduction of the data with respect to the disc drive 300.

The disc drive 300 is provided with: the optical disc 100; a spindle motor 351; an optical pickup 352; a signal recording/reproducing device 353; a CPU (drive control device) 354; a memory 355; a data input/output device 306; and a bus 357. Moreover, the host computer 400 is provided with: a CPU 359; a memory 360; an operation/display control device 307; an operation button 310; a display panel 311; and a data input/output control device 308.

The spindle motor 351 is intended to rotate and stop the optical disc 100, and operates upon accessing the optical disc. More specifically, the spindle motor 351 is constructed to rotate the optical disc 100 at a predetermined speed and to stop, under spindle servo from a not-illustrated servo unit or the like.

The optical pickup 352 is one specific example of the "recording device", the "first reading device", and the "second reading device" of the present invention. The optical pickup 352 is to perform the recording/reproduction with respect to the optical disc 100, and is provided with a semiconductor laser device, a lens, and the like. More specifically, the optical pickup 352 irradiates the optical disc 100 with a light beam, such as a laser beam, as reading light with a first power upon reproduction, and as writing light with a second power upon recording, with it modulated.

The signal recording/reproducing device 353 is one specific example of the "reproducing device" of the present invention. The signal recording/reproducing device 353 controls the spindle motor 351 and the optical pickup 352, to thereby perform the recording/reproduction with respect to the optical disc 100. More specifically, the signal recording/reproducing device 353 is provided with a laser diode (LD) driver, a head amplifier, and so on, for example. The LD driver drives a not-illustrated semiconductor laser located in the optical pickup 352. The head amplifier amplifies the output signal of the optical pickup 352, namely, the reflected light of a light beam, and outputs the amplified signal. More specifically, the signal recording/reproducing device 353 drives the not-illustrated semiconductor laser located in the optical pickup 352 in order to determine an optimum laser power by a recording process and reproduction process for the OPC pattern, along with a not-illustrated timing generator or the like, under the control of the CPU 354, at the time of OPC process.

The memory 355 is used in the whole data processing and the OPC process on the disc drive 300, including a buffer area for the record/reproduction data, an area used as an intermediate buffer when data is converted into the data that can be used on the signal recording/reproducing device 353, and the like. Moreover, the memory 355 is provided with: a Read Only Memory (ROM) area into which a program for performing an operation as a recording device, namely, a firmware program is stored; a buffer for temporarily storing the record reproduction data; a Random Access Memory (RAM) area into which a parameter required for the operation of a firmware program or the like is stored; and the like.

The CPU (drive control device) 354 is connected to the signal recording/reproducing device 353 and the memory 355 via the bus 357, and controls the entire disc drive 300 by giving an instruction to each constitutional element. In general, software for operating the CPU 354 or firmware is stored in the memory 355.

The data input/output control device 306 controls the input/output of the data from the exterior with respect to the disc drive 300, to thereby perform storage to and export from the data buffer on the memory 355. A drive control order, issued from the external host computer 400 (hereinafter referred to as a host) which is connected with the disc drive 300 through an interface, such as a SCSI (Small Computer System Interface) and an ATAPI (AT Attachment Packet Interface), is transmitted to the CPU 354 through the data input/output control device 306. Moreover, the record/reproduction data is exchanged with the host computer 400 through the data input/output control device 306 in the same manner.

The operation/display control device 307 receives an operation instruction and performs display with respect to the host computer 400, and transmits an instruction by the operation button 310, such as an instruction to record or reproduce, to the CPU 359. The CPU 359 transmits a control command to the disc drive 300 through the data input/output control device 308 on the basis of instruction information from the operation/display control device 307 and controls the whole disc drive 300. In the same manner, the CPU 359 can transmit a command to request the host to transmit an operation state, with respect to the disc drive 300. By this, the operation state of the disc drive 300, such as during recording and during reproduction, can be recognized, so that the PCU 359 can output the operation state of the disc drive 300 to the display panel 311, such as a fluorescent tube, through the operation/display control device 307.

The memory 360 is an internal storage apparatus used by the host computer 400. The memory 360 is provided with: ROM area into which a firmware program, such as a BIOS (Basic Input/Output System), is stored; a RAM area into which parameters required for an operating system and the operation of an application program or the like are stored; and the like. Moreover, the memory 360 may be connected to an external storage apparatus, such as a not-illustrated hard disk, through the data input/output control device 308.

One specific example used by combining the disc drive 300 and the host computer 400, as explained above, is household equipment, such as recorder equipment for recording and reproducing video images. The recorder equipment records a video signal from a broadcast reception tuner and an external connection terminal, onto a disc, and outputs the video signal reproduced from the disc to external display equipment, such as a television. The operation as the recorder equipment is performed by executing a program stored in the memory 360. Moreover, in another specific example, the disc drive 300 is a disc drive (hereinafter referred to as a drive), and the host computer 400 is a personal computer or a work station. The host computer, such as a personal computer, and the drive are connected through the data input/output control devices 306 and 308, such as a SCSI and an ATAPI, and application, such as writing software, installed in the host computer 400 controls the disc drive 300.

(2) Recording Operation

Next, with reference to FIG. 8 to FIG. 11, the recording operation of the information recording/reproducing apparatus 200 in the embodiment will be discussed. FIG. 8 is a flowchart conceptually showing an entire flow of the recording operation of the information recording/reproducing apparatus 200 in the embodiment. Each of FIG. 9 to FIG. 11 is a data structural view showing the procedure of the recording operation.

As shown in FIG. 8, at first, the optical disc 100 is loaded onto the disc drive 300 (step S101). At this time, it may be constructed to calculate an optimum laser power for the recording of the data by performing the OPC process by using the PCA 103 (or 113). Alternatively, it may be constructed to read various control data necessary for the recording of the data.

Then, on the basis of an instruction from the host computer 400 (or under the control of the CPU 359, which constitutes one specific example of the "first controlling device" of the present invention), the data is recorded into an "n"-th recording section (incidentally, "n" is an integer greater than or equal to 1, and its initial value is "1") (step S102). Then, on the basis of an instruction from the disc drive 300 (or under the control of the CPU 354), various information indicating the data structure of the "n"-th recording section (e.g. space bitmap information, the start address value and end address value of a recording area in which the data is already recorded, etc.) is recorded into the RMA 104 (or 114) as the RMD (step S103).

Specifically, as shown in FIG. 9, the file system information 101 and the user data (UD 10) are recorded into the first recording section of the user data area 105, and the file system information 111 and the user data (UD 11) are recorded into the first recording section of the user data area 115. The AP#1 and the AP#2 in this case are in the recording area into which the file system information 101 is recorded, and the AP#3 and the AP#4 in this case are in the recording area into which the file system information 111 is recorded. Therefore, at this time, the update block sector pointer 121 is not recorded in the RMA 104 (or 114) yet. When the file system information 101 (or 111) is read, the anchor data which is recorded in the anchor point as the default is directly read.

Moreover, a recoding area for the lead-in area (L10) is reserved between the RMA 104 and the user data area 105. A recording area for the lead-out area (L0) is reserved between the RMA 114 and the user data area 115.

In FIG. 8 again, the data is recorded into an "n+1"-th recording section, following the "n"-th recording section in which the data is recorded in the step S102 (step S104). Then, various information indicating the data structure of the "n+1"-th recording section is recorded into the RMA 104 (or 114) as the RMD.

At this time, under the control of the CPU 359, it is judged whether or not the anchor point is updated (or have been updated) due to the recording of the data into the "n+1"-th recording section (step S105). In other words, the anchor data, such as the VRS, AVDP, and VAT_ICB, is recorded (or have been recorded) into the recording area other than the anchor point as the default. If the anchor data is recorded into the recording area other than the anchor point as the default, it is judged that the anchor point is updated. On the other hand, if the anchor data is not recorded into the recording area other than the anchor point as the default (i.e. if the anchor data recorded in the anchor point as the default is effective), it is judged that the anchor point is not updated.

As a result of the judgment, if it is judged that the anchor point is not updated (the step S105: No), then, it is judged whether or not to perform the border close process (step S108).

On the other hand, it is judged that the anchor point is updated (the step S105: Yes), the address value of the recording area in which the anchor data is update-recorded (i.e. the address value of the updated anchor point) is recorded into the RMA 104 (or 114) as the update block sector pointer 121 (step S107). Then, it is judged whether or not to perform the border close process (the step S108).

Specifically, as shown in FIG. 10, if the effective VAT_ICB is recorded following the end of the user data (UD 21) in the second recording section, it means that the AP#4 is updated. Therefore, the address value of the recording area of the VAT_ICB (i.e. the address value of the recording area at the end of the user data (UD 21)) is recorded into the RMA 104 (114) as the update block sector pointer (AP#4) 121. Specifically, if the VAT_ICB is recorded at the end of the user data (UD 21) in the second recording section on the basis of the instruction of the host computer 400, the host computer 400 outputs the address value of the recording destination to the disc drive 300. Then, by the operation of the disc drive 300 (or the CPU 354 which is one specific example of the "third controlling device" of the present invention), the update block sector pointer 121, which indicates the address value outputted from the host computer 400, is recorded into the RMA 104 (or 114) as the RMD. Incidentally, the VAT_ICB is recorded, following the lastly recorded data, normally. Therefore, if the data recording operation is performed by using the VAT, the VAT_ICB is normally updated at each time of the data recording, so that the AP#4 can be also sequentially updated along with that. Therefore, the update block sector pointer (AP#4) 121 can be also sequentially updated. If the recording area in which the VRS and the AVDP except the VAT_ICB are recorded is updated from the anchor point as the default, the same operation is obviously performed even for these anchor data.

At this time, it is enough if at least the update block sector pointer 121 for the updated anchor point is recorded. In other words, out of the AP#1 to the AP#4, for example, if the AP#2 and the AP#4 are updated, the update block sector pointer (AP#2) 121 and the update block sector pointer (AP#4) 121 are recorded into the RMA 104 (or 114) as the effective data. On the other hand, no data may be recorded in the update block sector pointer (AP#1) 121 and the update block sector pointer (AP#3) 121, or the "00h" data may be recorded there.

After the update block sector pointer 121 is recorded into the RMA 104 (or 114), when the updated anchor point is accessed, the anchor data is read with reference to the update block sector pointer 121. On the other hand, when the not-updated anchor point is accessed, the anchor data recorded in the default anchor point is read without reference to the update block sector pointer 121.

In FIG. 8 again, it is judged whether or not the border close process is performed (the step S108). In other words, it is judged whether or not the data to be recorded is all recorded into the border area currently targeted to record the data, or whether or not the recording area in which the data is already recorded is larger than a predetermined size (e.g. the upper limit size of one border area). If the data to be recorded is all recorded in the border area currently targeted to record the data, or the recording area in which the data is already recorded is larger than the predetermined size, it may be judged that the border cross process is performed.

As a result of the judgment, if it is judged that the border close process is not performed (the step S108: No), after "n" is incremented (step S106), the data is recorded into a next recording section. In other words, the data is recorded into a new recording section, following the recording section in which the data is recorded in the step S104.

On the other hand, if it is judged that the border close process is performed (the step S108: Yes), the border close process is performed on the basis of the instruction of the host computer 400 (or under the control of the CPU 359) (step S109). Then, the anchor data recorded in the updated anchor point is recorded into the border-in area 116 and the border-out area 117 in the L1 layer (step S110).

Specifically, as shown in FIG. 11, various management information or the like is recorded into the border-out areas 107 and 117, and moreover, it is recorded into an EBZI (Extra Border in Area or Extra Border Zone) 141 (or 142) which corresponds to the border-in area of the first border area and which is included in the lead-in area 102 (or lead-out area 108). In addition, the update block sector effective flags (AP#1 to 4) are recorded into the newest physical format information recorded into the extra border in area 141.

Now, the more detailed data structures of the border-in area 106 (116), or the extra border-in area 141 (142), and the border-out area 107 (117) will be discussed with reference to FIG. 12 and FIG. 13. FIG. 12 is a data structural view conceptually showing the data structure of the border-in area 106 (116) or the extra border-in area 141 (142). FIG. 13 is a data structural view conceptually showing the data structure of the border-out area 107 (117). Incidentally the process described below is performed, mainly on the basis of the instruction from the disc drive 300.

As shown in FIG. 12, for example, the newest physical format information is recorded in the extra border-in area 141 in the L0 layer. The newest physical format information indicates distribution information (e.g. mapping information, etc.) of the data in the first border area. The newest physical format information has a size corresponding to 5 ECC blocks; however, it is not limited this size. Moreover, as described above, the update block sector effective flag 131 is recorded into the recording area with a byte position of "41" of the newest physical format information, under the control of the CPU 354, which is one specific example of the "fourth controlling device" of the present invention. Moreover, a LLA (Linking Loss Area) having a size of 1 ECC block is formed on the border between the extra border-in area 141 and another recording area located on the inner side of the extra border-in area 141, to thereby link the extra border-in area 141 and another recording area. Furthermore, a BSGA (Block Sync Guard Area) is formed on the most outer circumferential side of the extra border-in area 141.

On the other hand, the anchor data to be recorded into each of the updated AP#1 to 4 is recorded into the extra border-in area 142 in the L1 layer. In other words, the VRS, the AVDP, and the VAT_ICB are recorded, for example. Moreover, a LLA is formed on the border between the extra border-in area 142 and another recording area, as in the extra border-in area 141.

Incidentally, in the second border area or the like which may be prepared next to the first border area, the border-in area 106 in the L0 layer adopts the same data structure as that of the extra border-in area 141. Moreover, the border-in area 116 in the L1 layer adopts the same data structure as that of the extra border-in area 142.

As shown in FIG. 13, COR (Copies Of RMD) #0 to 4 are recorded in the border-out area 107 in the L0 layer. The COR #0 to 4 include the same information as the RMD recorded in the RMA 104 (or 114). Moreover, a LLA is formed on the border between the border-out area 107 and another recording area, as in the extra border-in area 141.

In addition to the COR #1 to 4, there may be recorded a stop block which includes flag information having a size of 2 ECC blocks and which indicates whether or not the data is recorded after the border-out area 117*a*, or there may be recorded a next border marker which indicates whether or not the data is further recorded next to the border area.

On the other hand, the anchor data to be recorded into each of the updated AP#1 to 4 is recorded into the border-out area 117 in the L1 layer, as in the extra border-in area 142 in the L1 layer. Furthermore, a BSGA is formed on the border between the border-out area 117 and another recording area located on the inner side of the extra border-out area 117.

As described above, if the anchor point is accessed (i.e. the anchor data is read) after the border close process is performed, the anchor data is read by accessing the border-in area 116 (or the extra border-in area 142) or the border-out area 117 in the L1 layer with reference to the update block sector effective flag 131, as occasion demands. The anchor data which is read by the disc drive 300 is outputted to the host computer 400.

In FIG. 8 again, after the border close process or the like is ended, it is judged whether or not the data recording operation is ended (step S112). In other words, it is judged whether or not the data to be recorded onto the optical disc 100 is all recorded, or whether or not an instruction to end (or stop) the recording operation is given by the user of the information recording/reproducing apparatus 200.

As a result of the judgment, if it is judged that the data recording operation is not ended (the step S112: No), after "n" is incremented (the step S106), the data is recorded into a next recording section. In other words, the data is recorded into a new recording section, following the recording section in which the data is recorded in the step S104.

On the other hand, if it is judged that the data recording operation is ended (the step S112: Yes), a finalize process is performed if needed (step S113). This finalize process is a process to allow the data recorded on the optical disc 100 by the information recording apparatus, such as a DVD-R|RW recorder, to be reproduced by the information reproducing apparatus, such as a DVD-ROM player. Specifically, various management information or the like is recorded into the lead-in area 102 and the lead-out area 118. Then, the middle areas 109 and 119 are prepared on the most outer circumferential side of the area in which the data is recorded. Into the middle areas 109 and 119, for example, the "00h" data is recorded.

Incidentally, even without the finalize process, if the various management information or the like is recorded in the border-in area 106 (or 116) and the border-out area 107 (or 117), it is possible to reproduce the information on a DVD-ROM player which can recognize the multi border structure of the optical disc.

As explained above, according to the information recording/reproducing apparatus 200 in the embodiment, the anchor data which is to be read in order to read the file system information 101 (or 111) can be recorded into an arbitrary recording area on the optical disc 100 (more specifically, an arbitrary recording area of the user data area 105 (or 115)). In other words, the anchor point in which the anchor data is recorded can be located in an arbitrary recording area on the optical disc 100 (more specifically, an arbitrary recording area of the user data area 105 (or 115)). Therefore, even if the data is recorded by a unit of the border area as described above, it is possible to preferably read the anchor data, by which it is possible to preferably read the file system information 101 (or 111). Moreover, since the anchor point can be disposed in an arbitrary recording area, it is possible to additionally record the data, more flexibly, even on a write-once type optical disc.

Here, according to an information recording/reproducing apparatus in a comparison example, as shown in FIG. 14(a), if the recording is performed into the second border area following the first border area, the LRA recognized by the information recording/reproducing apparatus in the comparison example is not updated to an N2 in FIG. 14(a) but remains an N1. This is because the second border area is distributed in such a form that it is covered with the first border area on the disc volume space shown in FIG. 14(b). As a result, the information recording/reproducing apparatus in the comparison example cannot update the LRA to the N2 in accordance with the recording of the data into the second border area and recognize it. Thus, it is hardly possible or impossible to preferably read the anchor information (the ADVP and the VAT-_ICB) recorded in the recording area (AP#3) with a logical block address of "LRA—256h" and the recording area (AP#4) with a logical block address of "LRA".

However, according to the information recording/reproducing apparatus 200 in the embodiment, the update block sector pointer 121 is recorded, so that it is possible to preferably recognize the recording area in which the anchor data is recorded (the updated anchor point), whether the data is recorded into the second border area or not. Namely, it is possible to recognize the recording area in which the anchor data is recorded (the updated anchor point), with reference to the update block sector pointer 121, in any aspect which is adopted to record the data. Therefore, it is possible to preferably read the anchor data.

Moreover, it is enough if the update block sector pointer 121 is referred to when the anchor data needs to be read. In other words, it is unnecessary to refer to the update block sector pointer 121 throughout the whole recording operation, and it is possible to perform the above-mentioned operation without increasing the processing load of the information recording/reproducing apparatus 200.

Moreover, after the border close process is performed, it is possible to recognize whether the anchor data is recorded in the anchor point as the default or in the updated anchor point, relatively easily and quickly, by referring to the update block sector effective flag 131. As a result, it is possible to read the anchor data, preferably and quickly, whether the anchor data is recorded in the anchor point as the default or in the updated anchor point (particularly, the border-in area 116 or the border-out area 117 in the L1 layer, after the border close process). Moreover, after the border close process is performed, the anchor data can be read without reference to the RMA 104 (or 114), so that it is possible to preferably obtain the anchor data even on a DVD-ROM only drive which cannot read the RMA 104 (or 114).

In addition, in performing the border close process, the anchor data is recorded in two places, which are the border-in area 116 (or the extra border-in area 142) in the L1 layer and the border-out area 117 in the L1 layer. Thus, even if either one of the anchor data cannot be read for some reasons, the other anchor data can be read, to thereby read the file system information 101 (or 111), preferably. In particular, the border-in area 116 and the border-out area 117 are located away from each other, sandwiching the user data area 115 between them, which hardly causes such a situation that the both anchor data cannot be read at the same time. Namely, it is possible to receive such an advantage that a failure-proof capability improves more by recording the anchor data in two places, as described above.

Moreover, according to the UDF standard, it is necessary to record the AVDP in two places on the optical disc 100 (e.g. the recording area with a logical block address (LBA) of "256h", the recording area with a logical block address of "LRA—256h", etc.). Such a standard is also satisfied according to the embodiment, which is advantage.

Incidentally, on optical discs currently distributed in the market, such as a CD-ROM (multi session), a CD-R/DVD-R (single layer), a WORM (Write Once Read Many), a BD-R (Blu-ray Disc-R), and a DVD+R (dual layer), if the above-mentioned operation is performed, it is necessary to once close a session which is the unit of each recording operation. In other words, in order to record/reproduce the data in the second border area (or a recording area corresponding to the second border area) in recording/reproducing the data in the first border area (or a recording area corresponding to the first border area), it is necessary to close the session once in the first border area. In the embodiment, such an operation can be performed as a series of continuous operation, so that it is excellent as compared to these optical discs.

Incidentally, as shown in FIG. 15(a) and FIG. 15(b), it may be constructed to judge whether or not the data is completely recorded (or completed) in one recording section. FIG. 15(a) and FIG. 15(b) are explanatory diagrams showing an aspect of the operation of judging whether or not the data is completely recorded in a recording section.

As shown in FIG. 15(a), if the recording area pointed by the update block sector pointer 121 (i.e. the updated anchor point) does not correspond to the recording area of the LRA, which is an end recording point in which the data is recorded at a current time point, it is judged that the data recording is not completed. In other words, since the update block sector pointer 121 indicates the recording position of the anchor data which is update-recorded because the data is recorded into a certain recording section, if the data recording is not completed in the "n+1"-th recording section in FIG. 15(a), it is impossible to update-record the anchor data due to the data recording into the "n+1"-th recording section. Thus, in the situation of FIG. 15(a), the update block sector pointer 121 indicates the recording position of the anchor data which is update-recorded due to the data recording into the previous "n"-th recording section. From this, it is possible to judge that the data recording into the "n+1"-th recording section is not completed and it is still during recording.

On the other hand, as shown in FIG. 15(b), if the recording area pointed by the update block sector pointer 121 corresponds to the recording area of the LRA at the current time point, it is judged that the data recording is completed.

By referring to the update block sector pointer 121 and the LRA at the current time point in performing such a judgment, it is possible to judge whether or not the data recording onto the optical disc 100 is completed, relatively easily. Namely, it is possible to judge whether or not the data recording onto the optical disc 100 is completed, only by using the optical disc 100, regardless of the inner data which is used inside the information recording/reproducing apparatus 200.

Incidentally, in order to perform such a judgment, it is necessary to update-record the anchor data after the data recording into a certain recording section is completed. Then, along with the update-recording of the anchor data, it is necessary to update the update block sector pointer 121.

(2) Reproduction Operation

Next, with reference to FIG. 16, the reproduction operation of the information recording/reproducing apparatus 200 in the embodiment will be discussed. FIG. 16 is a flowchart conceptually showing an entire flow of the reproduction operation of the information recording/reproducing apparatus 200 in the embodiment. Incidentally, here, an explanation is given to the operation of reproducing the data recorded on an optical disc (e.g. the above-mentioned optical disc 100 shown in FIG. 10) before the border close process is performed.

As shown in FIG. 16, at first, the optical disc 100 is loaded (step S201). Then, the RMD recorded in the RMA 104 (or 114) is read by the instruction of the disc drive 300, and the update block sector pointer 121 is read (step S202). At this time, the disc drive 300 outputs the data which indicates that the optical disc 100 is loaded.

Then, the host computer 400 outputs an access request for accessing the default anchor point, to the disc drive 300, in order to read the file system information 101 (or 111) (step S203). In other words, the host computer 400 outputs a reading request for reading the anchor data, to the disc drive 300.

Then, in response to the access request from the host computer 400, the disc drive 300 reads the anchor data recorded in the updated anchor point indicated by the corresponding update block sector pointer 121 (step S204). Specifically, in response to the access request for accessing the anchor point with a logical block address of "16h" outputted form the host computer 400, the disc drive 300 reads the anchor data recorded in the updated anchor point indicated by the update block sector pointer (AP#1) 121. Moreover, in response to the access request for accessing the anchor point with a logical block address of "256h" outputted form the host computer 400, the disc drive 300 reads the anchor data recorded in the updated anchor point indicated by the update block sector pointer (AP#2) 121. Moreover, in response to the access request for accessing the anchor point with a logical block address of "LRA—256h" outputted form the host computer 400, the disc drive 300 reads the anchor data recorded in the updated anchor point indicated by the update block sector pointer (AP#3) 121. Moreover, in response to the access request for accessing the anchor point with a logical block address of "LRA" outputted form the host computer 400, disc drive 300 reads the anchor data recorded in the updated anchor point indicated by the update block sector pointer (AP#4) 121.

However, if there is no corresponding update block sector pointer (or if only the "00h" data is recorded), the disc drive 300 reads the anchor data recorded in the default anchor point.

Then, the read anchor data is outputted to the host computer 400, and the host computer 400 reads the effective (or newest) file system information 101 (or 111) (step S205).

Then, with reference to the read file system information 101 (or 111), the data recorded on the optical disc 100 is reproduced on the basis of an instruction from the host computer 400 (step S206).

Then, it is judged whether or not the data reproduction operation is ended (step S207). In other words, it is judged whether or not the reproduction of the data recorded on the optical disc 100 is all ended, or whether or not an instruction to end (or stop) the reproduction operation is given by the user of the information recording/reproducing apparatus 200.

As a result of the judgment, if it is judged that the reproduction operation is not ended (the step S207: No), the operational flow returns to the step S206 again, and the data reproduction operation is continued. On the other hand, if it is judged that the reproduction operation is ended (the step S207: Yes), the reproduction operation is ended, and the optical disc 100 is ejected from the disc drive 300, if needed.

As described above, if the access request for accessing the default anchor point is given from the host computer 400, the disc drive 300 refers to the update block sector pointer, to thereby read the anchor data recorded in the updated anchor point, if needed. It is possible to prevent such a disadvantage that it is impossible to read the file system information because the anchor data recorded in the default anchor point is read, as in the information recording/reproducing apparatus in the above-mentioned comparison example.

MODIFIED EXAMPLE

Next, with reference to FIG. 17, the modified example of the optical disc 100 in the embodiment will be discussed. FIG. 17 is a data structural view showing the data structure of one portion of the RMD of an optical disc 100a in the modified example.

As shown in FIG. 17, on the optical disc 100a in the modified example, update block original sector addresses (AP#1 to #4) 122 are recorded as one part of the RMD, in addition to the above-mentioned update block sector pointers (AP#1 to #4) 121. As in the above-mentioned update block sector pointers 121, the update block original sector addresses 122 are recorded in a recording area with byte positions of "0" to "15" in the field 3 of the RMD recorded in the RMA 104 (or 114). Along with this, on the optical disc 100a in the modified example, the update block sector pointers 121 are recorded in a recording area with byte positions of "16" to "31" in the field 3 of the RMD recorded in the RMA 104 (or 114).

The update block original sector address 122 indicates the address value of the above-mentioned default anchor point (or a recording area corresponding to the default anchor point). In other words, in the above-mentioned embodiment, the anchor point is fixed in the recording areas with logical block addresses of "16h", "256h", "LRA—256h", and "LRA"; however, in the modified embodiment, the anchor point can be designated in an arbitrary recording area. For example, if the update block original address (AP#1) indicates "32h", the VRA, which is one example of the anchor data, is recorded in the default anchor point with a logical block address of "32h".

Then, the update block sector pointer 121 in the modified example indicates the address value of the recording area in which the anchor data, which is to be recorded in the default anchor point which is indicated by the update block original sector address 122, is update-recorded. In other words, the update block sector pointer (AP#1) 121 indicates the address value of the recording area in which the anchor data, which is recorded in the default anchor point indicated by the update block original sector address (AP#1) 122, is update-recorded. Moreover, the update block sector pointer (AP#2) 121 indicates the address value of the recording area in which the anchor data, which is recorded in the default anchor point indicated by the update block original sector address (AP#2) 122, is update-recorded. Moreover, the update block sector pointer (AP#3) 121 indicates the address value of the recording area in which the anchor data, which is recorded in the default anchor point indicated by the update block original sector address (AP#3) 122, is update-recorded. Furthermore, the update block sector pointer (AP#4) 121 indicates the address value of the recording area in which the anchor data, which is recorded in the default anchor point indicated by the update block original sector address (AP#4) 122, is update-recorded.

According to the modified example, the anchor point can be set, arbitrarily, so that it is possible to perform the recording operation, more flexibly.

Incidentally, the recording operation and the reproduction operation in the modified example are performed in the same procedure as in the above-mentioned embodiment, so that they will not be discussed in detail here.

Moreover, in the above-mentioned embodiment, the optical disc 100 is explained as one example of the information recording medium, and the recorder or player related to the optical disc 100 is explained as one example of the information recording/reproducing apparatus. The present invention, however, is not limited to the optical disc and the recorder thereof, and can be applied to other various high-density-recording or high-transmission-rate information recording media, and the recorders thereof.

The present invention is not limited to the above-described embodiments, and various changes may be made, if desired, without departing from the essence or spirit of the invention which can be read from the claims and the entire specification. An information recording medium, information recording apparatus, an information recording method, an information reproducing apparatus, an information reproducing method, and a computer program for recording control or for reproduction control, all of which involve such changes, are also intended to be within the technical scope of the present invention.

Industrial Applicability

The information recording medium, the information recording apparatus, the information recording method, the information reproducing apparatus, the information reproducing method, and the computer program according to the present invention can be applied to a high-density optical disc, such as a DVD, and further can be applied to an information recording/reproducing apparatus, such as a DVD recorder and a DVD player. Moreover, they can be applied to an information recording/reproducing apparatus or the like which is mounted on various computer equipment for consumer use or for commercial use, or which can be connected to various computer equipment.

The invention claimed is:

1. An information recording apparatus, comprising:
a recording device for recording record information onto an information recording medium, comprising a first recording layer and a second recording layer in which the record information can be recorded;
a first controlling device for controlling said recording device to record the record information alternately into said first recording layer and said second recording layer in an opposite track path manner and thereby to form a plurality of border areas, wherein the border area (i) is a recording unit by which the record information is alternately recorded and (ii) includes a first area portion in the first recording layer and a second area portion in the second recording layer whose radius position is substantially same as that of the first area portion, and wherein when the record information is recorded in each border area, the first controlling device controls said recording device (i) to firstly record the record information into the first area portion from an inner circumferential side of the information recording medium to an outer circumferential side of the information recording medium, then (ii) to perform a layer jump which changes a recording layer targeted for recording from the first recording layer to the second recording layer and then (iii) to record the record information into the second area portion from the outer circumferential side to the inner circumferential side;
a second controlling device for controlling said recording device to update-record anchor information, which is recorded in anchor area as being a start point in reading file system information for controlling at least one of recording and reproduction of the record information and which is referred to in reading the file system information, into a recording area in each of said first recording layer and said second recording layer, whose position is variable, other than the anchor area as the record information after a recording of the border area is finished, wherein the anchor area is prepared each of said first recording layer and said second recording layer;

a third controlling device for controlling said recording device to record four update block sector pointers, each of which indicates an address value of the recording area other than the anchor area in which the anchor information is update-recorded, wherein one of the four update block sector pointers indicates an address value of the most inner edge of the recording area into which the record information is lastly recorded and which is in the second recording layer;

a fourth controlling device for controlling said recording device to record four update block sector effective flags, each of which corresponds to respective one of the update block sector pointers and each of which indicates whether or not the anchor information is update-recorded into the recording area other than the anchor area; and a fifth controlling device for controlling said recording device to record the anchor information into a border-in area and a border-out area each of which is prepared on said second recording layer and each of which is a border management area to manage the border area, in closing the border area.

2. The information recording apparatus according to claim 1, wherein said second controlling device controls said recording device to update-record the anchor information into at least one portion of a user data area to record therein the record information.

3. The information recording apparatus according to claim 2, wherein said second controlling device controls said recording device to update-record the anchor information into the at least one portion of the user data area before closing the border area.

4. The information recording apparatus according to claim 1, wherein said second controlling device controls said recording device to update-record the anchor information into the border management area.

5. The information recording apparatus according to claim 1, wherein said third controlling device controls said recording device to record the update block sector pointers into a recording management area to manage the recording of the record information.

6. The information recording apparatus according to claim 1, wherein said second controlling device controls said recording device to update-record the anchor information into a recording area which follows a recording area in which the record information is already recorded, in completing the recording of the record information, and said information recording apparatus further comprises a judging device for judging whether or not the address value indicated by at least one of the update block sector pointers is equal to an address value of a recording area in which the record information is lastly recorded.

7. The information recording apparatus according to claim 1, wherein said fourth controlling device controls said recording device to record the update block sector effective flags into a border management area to manage the border area.

8. An information recording method in an information recording apparatus comprising:

a recording device for recording record information onto an information recording medium, comprising a first recording layer and a second recording layer in which the record information can be recorded, said information recording method comprising:

a first controlling process of controlling said recording device to record the record information alternately into said first recording layer and said second recording layer in an opposite track path manner and thereby to form a plurality of border areas, wherein the border area (i) is a recording unit by which the record information is alternately recorded and (ii) includes a first area portion in the first recording layer and a second area portion in the second recording layer whose radius position is substantially same as that of the first area portion, and wherein when the record information is recorded in each border area, the first controlling process controls said recording device (i) to firstly record the record information into the first area portion from an inner circumferential side of the information recording medium to an outer circumferential side of the information recording medium, then (ii) to perform a layer jump which changes a recording layer targeted for recording from the first recording layer to the second recording layer and then (iii) to record the record information into the second area portion from the outer circumferential side to the inner circumferential side;

a second controlling process of controlling said recording device to update-record anchor information, which is recorded into anchor area as being a start point in reading file system information for controlling at least one of recording and reproduction of the record information and which is referred to in reading the file system information, into a recording area in each of said first recording layer and said second recording layer, whose position is variable other than the anchor area as the record information after a recording of the border area is finished, wherein the anchor area is prepared each of said first recording layer and said second recording layer;

a third controlling process of controlling said recording device to record four update block sector pointers, each of which indicates an address value of the recording area other than the anchor area in which the anchor information is update-recorded, wherein one of the four update block sector pointers indicates an address value of the most inner edge of the recording area into which the record information is lastly recorded and which is in the second recording layer;

a fourth controlling process of controlling said recording device to record four update block sector effective flags, each of which corresponds to respective one of the update block sector pointers and each of which indicates whether or not the anchor information is update-recorded into the recording area other than the anchor area; and a fifth controlling device for controlling said recording device to record the anchor information into a border-in area and a border-out area each of which is prepared on said second recording layer and each of which is a border management area to manage the border area, in closing the border area.

* * * * *